Oct. 15, 1968    J. W. SUNDSTROM    3,406,083
FLANGE BUSHING MACHINE
Filed Feb. 14, 1963    8 Sheets-Sheet 1

INVENTOR.
James W. Sundstrom
BY
Olson, Trexler
Wolters & Bushnell attys.

Oct. 15, 1968     J. W. SUNDSTROM     3,406,083
FLANGE BUSHING MACHINE
Filed Feb. 14, 1963     8 Sheets-Sheet 2
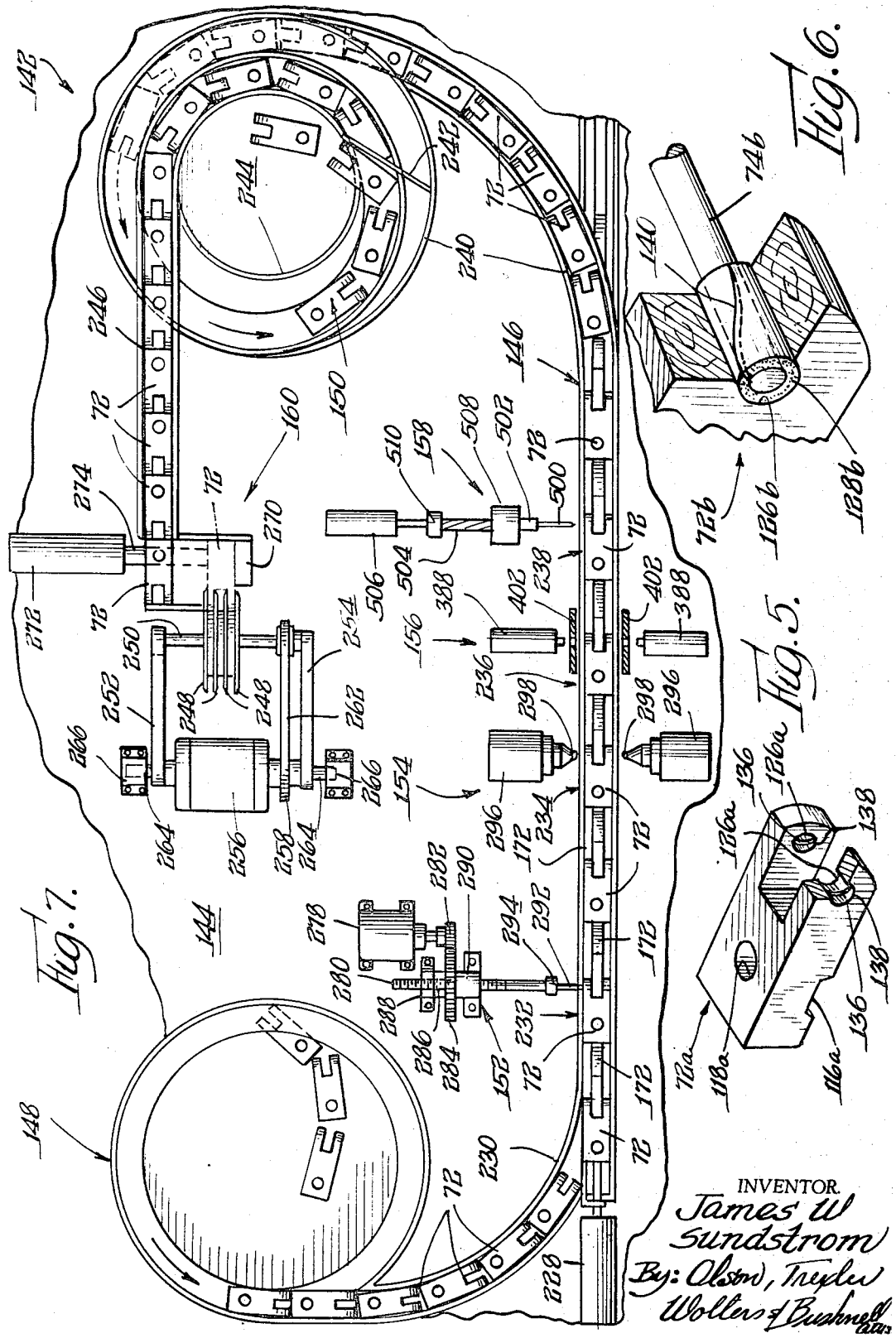
INVENTOR.
James W Sundstrom
By: Olson, Trexler
Wolters & Bushnell

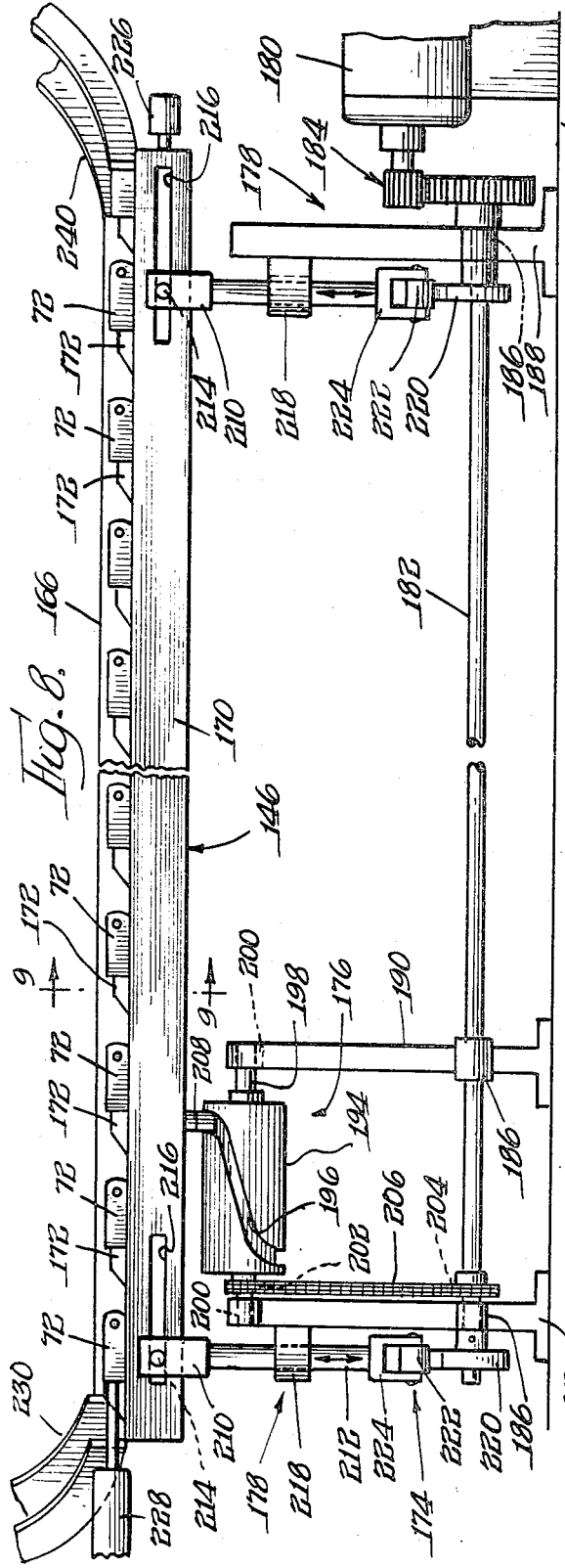

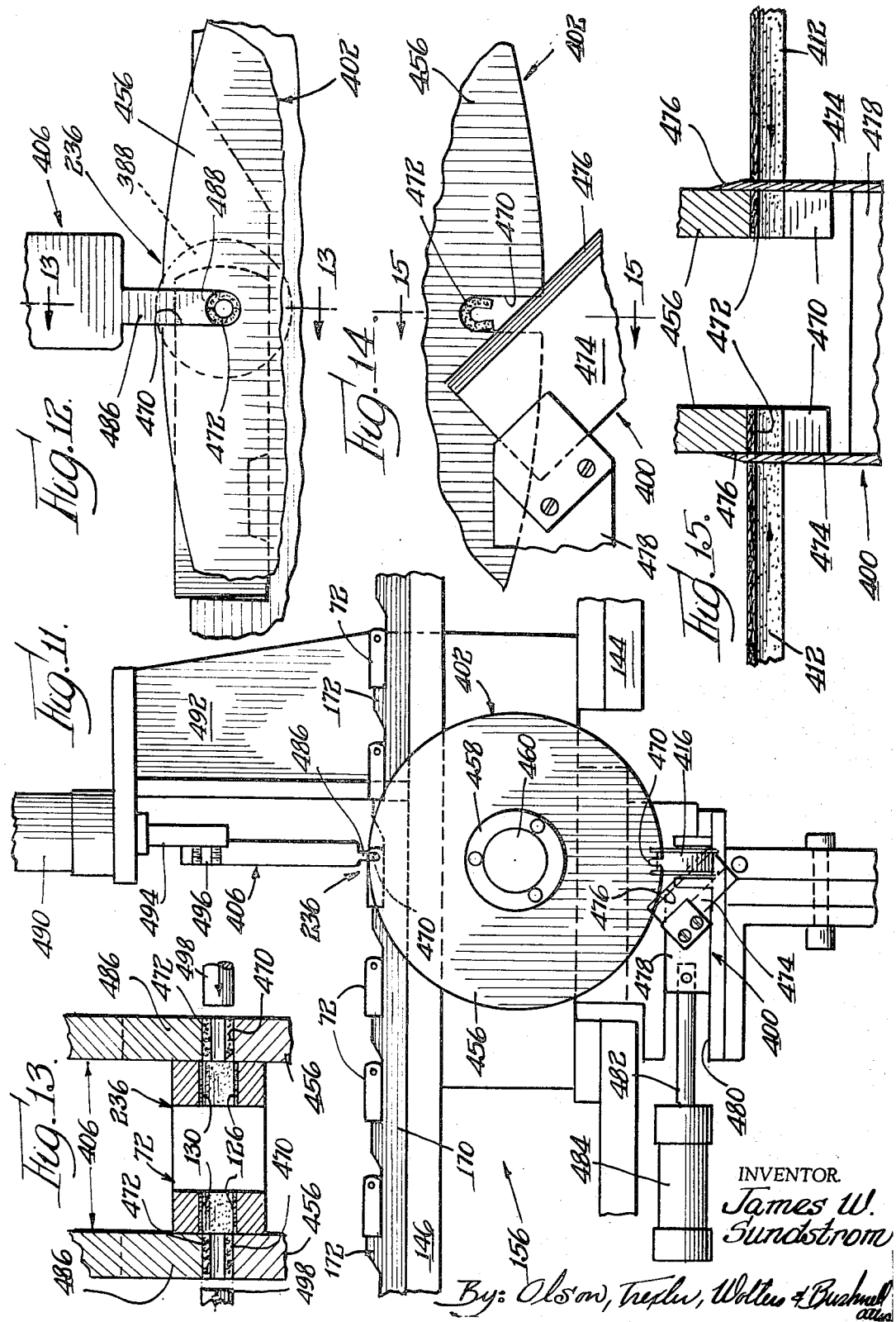

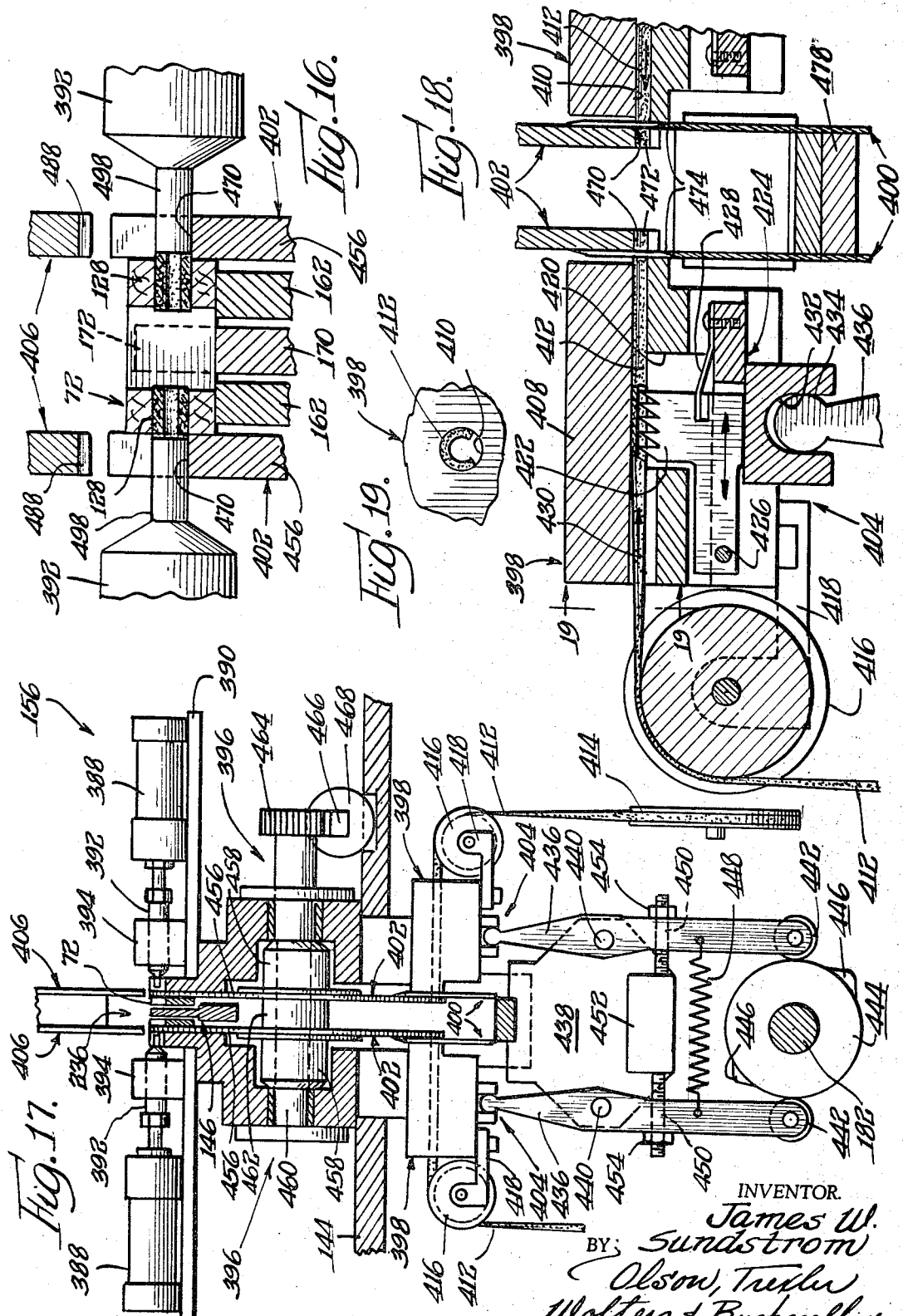

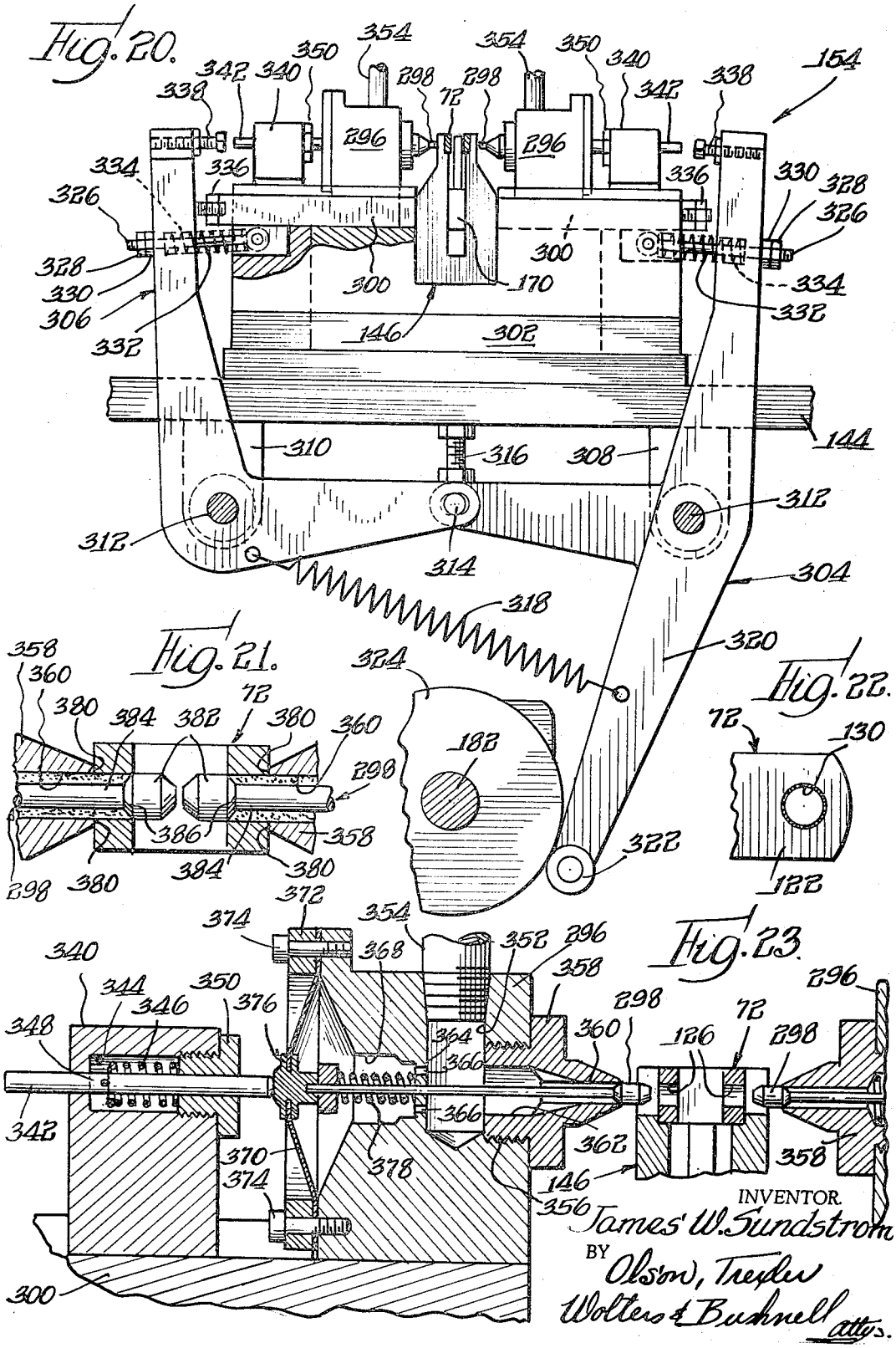

Oct. 15, 1968
J. W. SUNDSTROM
3,406,083
FLANGE BUSHING MACHINE
Filed Feb. 14, 1963
8 Sheets-Sheet 7
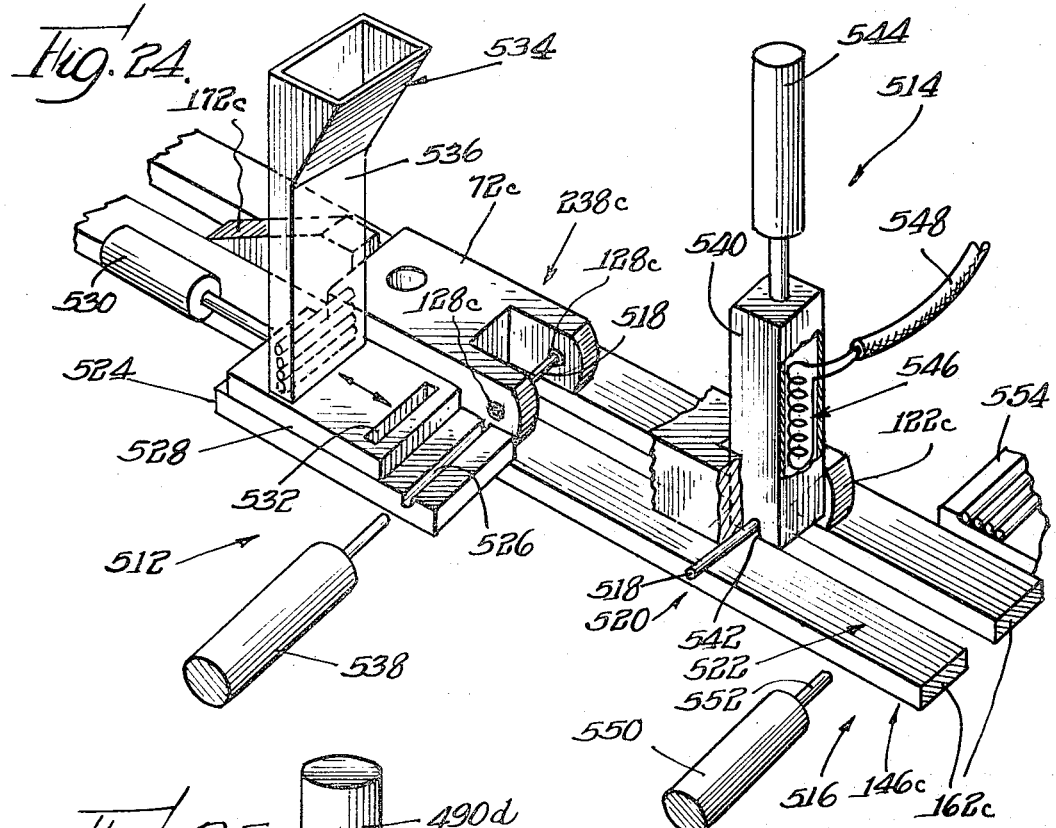
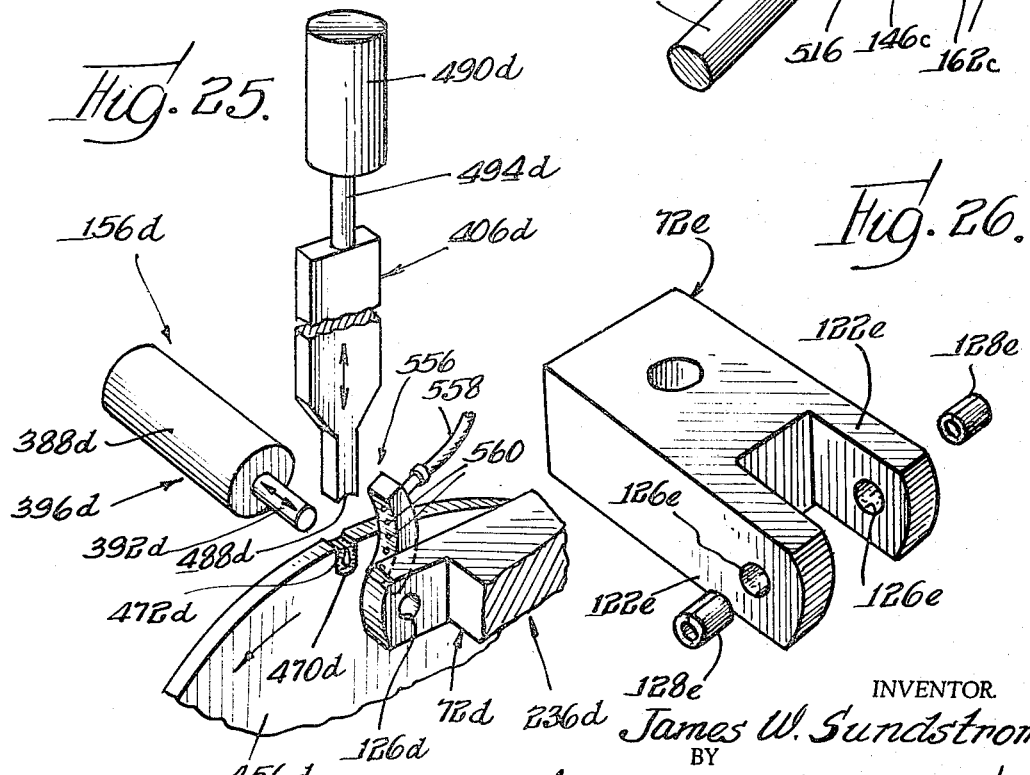
INVENTOR.
James W. Sundstrom
BY
Olson, Trexler, Wolters & Bushnell
attys.

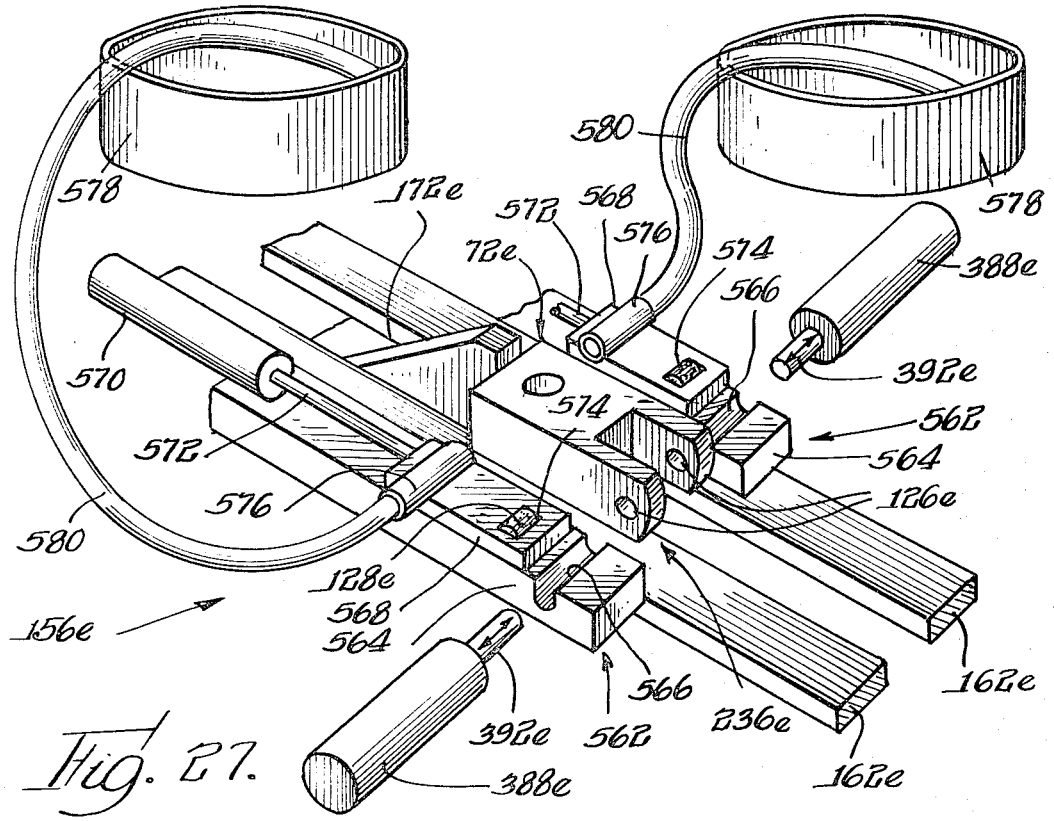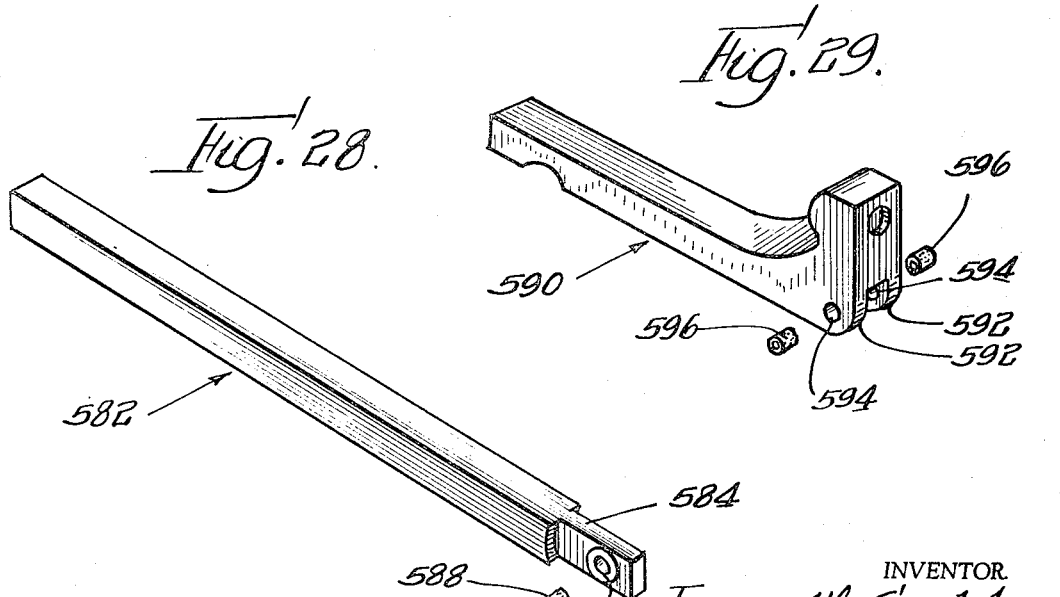

United States Patent Office 3,406,083
Patented Oct. 15, 1968

3,406,083
FLANGE BUSHING MACHINE
James W. Sundstrom, Holly Springs, Miss., assignor to The Wurlitzer Company, Chicago, Ill., a corporation of Ohio
Filed Feb. 14, 1963, Ser. No. 258,477
20 Claims. (Cl. 156—423)

This invention relates generally to the art of manufacturing pianos and analogous musical instruments and relates more particularly to machines for making bushed parts to be used in the assembly known as a piano action.

The invention also relates to a novel intermediary support member for use in pivotally mounting selected parts in a piano action assembly.

In the conventional piano action assembly, there is an individual action mechanism for each of the keys in the keyboard, and these several action mechanisms are mounted on a main rail that extends horizontally through the body of the piano case. This main rail constitutes a principal support; and intermediary support members, known generally as flanges, are used in attaching certain primary operating components of each action mechanism to the main rail. Ordinarily, the piano action parts known respectively as the whip, the butt knuckle and the damper lever are attached to the main rail using such a flange. Since the listed parts are intended to be pivotally mounted to the main rail, the intermediary support members or flanges advantageously comprises a body from which two parallel arms extend. These arms are perforated and anti-friction bushing are situated in the perforated apertures to journal a metal pin by which the corresponding primary part is pivotally mounted to the flange.

In the past, these bushings have been made of felt, and they have been assembled to the flanges in a series of substantially manual operations. According to the prior art procedure, a number of the flanges are first strung on a narrow strip of felt by pulling the felt strip through the perforated arms of the flanges, the cylindrical shape of the apertures forming the felt strip to a corresponding shape. Thereafter, the flanges are bunched at one end of the felt strip and glue or other adhesive material is applied to the exposed length of the strip. The flanges are then pulled over the adhesive-wet felt, and additional glue or adhesive is applied progressively toward the dry end of the strip as the flanges are shifted toward the wet end. After the glue or adhesive has set, the excess felt is chopped from between the flanges and from between the arms of each flange.

This prior art procedure for inserting the felt bushings in the flanges is quite wasteful of the felt, more felt being discarded during the chopping operation than is actually used in the flanges. Since a high quality of felt is required to provide the desired bearing properties in the bushings, a substantial economic loss results. Moreover, production is slowed by the numerous manual operations, and the finished goods are burdened by the resultantly high labor costs.

Therefore, an important object of the present invention is to provide a flange bushing machine which makes highly economical use of the bushing material.

Another object of the invention is to provide a bushing machine which substantially reduces the labor cost element.

Still another object of the invention is to provide a machine for rapidly and accurately assembling bushings to piano action parts.

A more general object of the invention is to provide new and improved apparatus for bushing piano action parts.

A further object of the invention is to provide apparatus for forming bushing material into a sleeve of approximately the desired length for bushing a piano action part.

A still further object of the invention is to provide apparatus for inserting a preformed bushing into a piano action part.

A yet further object of the invention is to provide a piano action part that is arranged to accept more than a film of adhesive on the surfaces of a bore that is adapted to receive a sleeve bushing.

And a still yet further object of the invention is to provide a piano action part which is bushed to insure proper location of the pivot pin received in the bushing.

A more general object of the invention in this regard is to provide a new and improved bushed part for a piano action assembly.

These and other objects and features of the invention will become more apparent from a reading of the following disclosure.

Apparatus in accord with the invention includes a guide for supporting a plurality of piano action parts in predetermined spatial orientation, cyclically operable means for progressively and incrementally transporting these parts through the guide, the end of each increment of movement defining a rest position for the parts, a dispenser located laterally of the guide at a first one of the rest positons for applying adhesive material to the surface of a pivot bore formed in each of the action parts, and a bushing assembly arrangement disposed laterally of the guide at a second one of the rest positions processwise subsequent to the dispenser for inserting a tubular bushing in the pivot bore formed in each of the action parts.

In order that the principles of the invention may be readily understood, several embodiments thereof are shown in the accompanying drawings wherein:

FIG. 5 is a perspective view of a modified form of the flange of the invention, an end of one arm of the part being broken away to reveal the groove which is formed in the pivot bore and the rib of adhesive material which is applied to the surface of the bore at the groove;

FIG. 6 is an enlarged, fragmentary perspective view of a further modified form of the flange of the invention, the tubular bushing being shown to have an angulated seam whereby to prevent the cooperating pivot pin from entering into the fissure between the abutting edges forming such seam;

FIG. 7 is a top plan view of a machine constructed in accordance with the principles of the invention and arranged to be used in making flange parts for a piano action;

FIG. 8 is a side elevational view of the machine of

Figure 1:
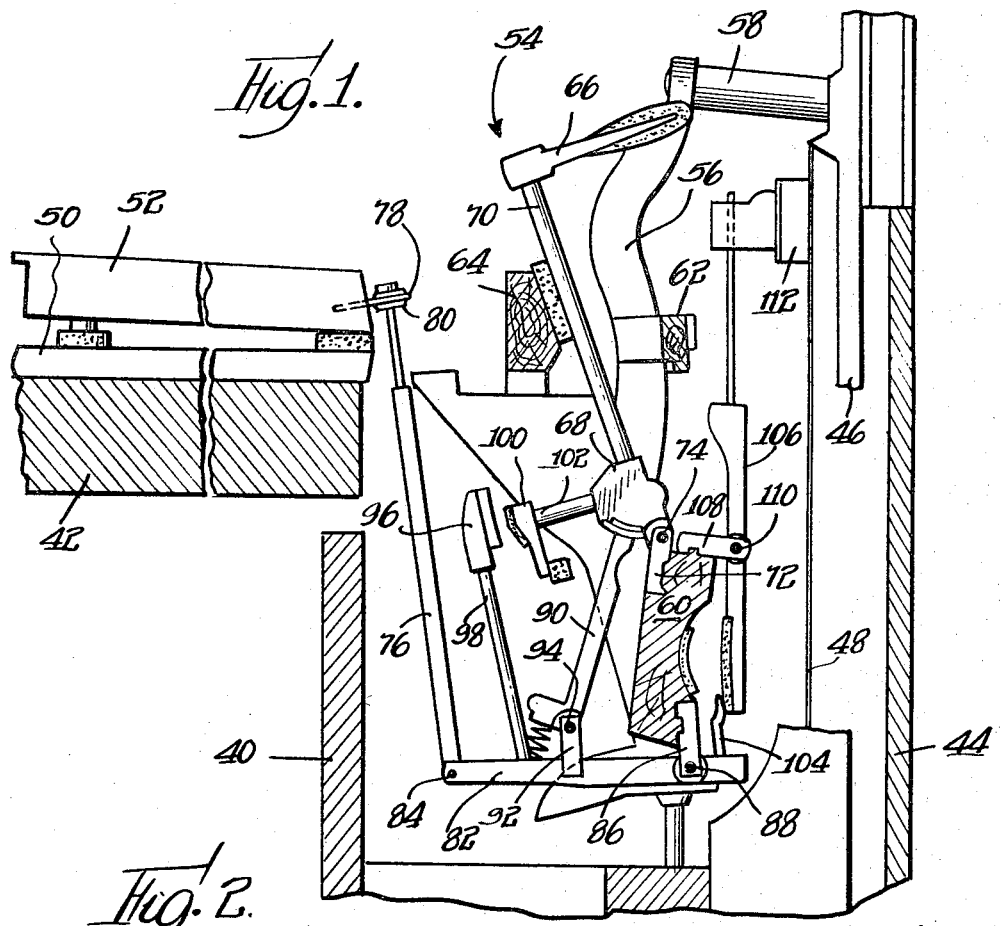
FIG. 1 is an end elevational view taken in cross-section through a piano structure to show the mounting and cooperation of the various parts in an individual action mechanism.

FIG. 7, one side of the machine being cut away to show in particular the cyclically operable drive and the guide which is used in supporting the parts being processed;

FIG. 9 is an enlarged view taken substantially along the line 9—9 of FIG. 8;

FIG. 10 is an enlarged perspective view of the trimming apparatus incorporated in the machine of FIG. 7 as a final work station;

FIG. 11 is an enlarged, side elevational view of the felt stuffing station incorporated in the machine of FIG. 7;

FIG. 12 is a further enlarged, side elevational view showing the cooperation of a forming member and a transport member in shaping a piece of bushing material to tubular form prior to insertion of the bushing material into the pivot bores of a properly positioned flange part;

FIG. 13 is a view taken substantially along the line 13—13 of FIG. 12;

FIG. 14 is an elevational view of the transport member of FIG. 12, illustrating in particular the remote position where a cutter element is employed in severing a selected length of the bushing material from a continuous strip of such material;

FIG. 15 is a view taken substantially along the line 15—15 of FIG. 14;

FIG. 16 is a view similar to the showing of FIG. 13 but illustrating final assembly of the bushings in the pivot bores of the flange part;

FIG. 17 is an end elevational view in somewhat reduced scale of the apparatus of FIG. 11, showing in particular the bushing material feeding and cutting elements which cooperate with the bushing material transport member;

FIG. 18 is an enlarged, cross-sectional view of the bushing material transport arrangement used in the apparatus of FIG. 17;

FIG. 19 is an enlarged view taken substantially along the line 19—19 of FIG. 18;

FIG. 20 is an enlarged, end elevational view taken through the machine of FIG. 7 to illustrate the adhesive material dispensing arrangement disposed processwise preceding the felt stuffing station of FIGS. 11-19;

FIG. 21 is an enlarged, cross-sectional view showing the relationship of a flange part with the dispenser body and applicator piston of the apparatus of FIG. 20;

FIG. 22 is a side elevational view of one of the arms of the flange part after adhesive material has been applied to the surface of the pivot bore formed therein;

FIG. 23 is an enlarged, cross-sectional view similar to the showing of FIG. 20 but illustrating the dispenser arrangement in greater detail;

FIG. 24 is a perspective view of a portion of a modified machine for bushing piano action parts, showing in particular the insertion of temporary pins in the tubular bushings which are fitted into a flange part and further showing heating of the temporary pin for curing the adhesive material by which the bushings are secured in place;

FIG. 25 is a perspective view of a portion of a still further modified embodiment of the machine of the invention wherein the bushing material is precoated with a dry adhesive and wherein a steam manifold is employed in activating the adhesive material immediately prior to insertion of the bushing in the pivot bore of a flange part;

FIG. 26 is a perspective view of another modified form of the flange part of the invention, modified in particular to employ preformed tubular bushings;

FIG. 27 is a perspective view of still another modified form of the machine of the invention, particularly adapted for assembly of the tubular bushings of FIG. 26 to the flange part;

FIG. 28 is a perspective view of an abstract or sticker constructed and bushed according to the invention; and FIG. 29 is a perspective view of a fly or jack constructed and bushed in accordance with principles of the invention.

Referring now in detail to the drawings, specifically to FIG. 1, a piano structure is shown to include a front panel 40, a keybed 42 and a frame 44. In accordance with conventional practice, a backplate 46 is affixed to the frame 44 for supporting piano strings such as piano string 48. In further accord with conventional practice, a balance rail, not shown, is mounted on a plate 50 that is fastened to the keybed 42, the balance rail acting to support a number of piano key levers such as piano key lever 52.

Depression of the piano key 52 is arranged to cause a striking of the corresponding string 48 through a piano action mechanism indicated generally by the numeral 54. The action mechanism 54 is mounted in the piano structure by means of a number of action brackets 56, each of the brackets 56 being fastened to the backplate 46 by means including a tubular action spacer 58. A main rail 60, a spring rail 62 and a hammer rail 64 extend through the piano structure to be affixed to each of the action brackets 56 for purposes of supporting the individual action components.

The action mechanism 54 includes a hammer 66 which is mounted to a butt knuckle 68 by a hammer shank 70, the butt knuckle 68 being pivotally mounted to the main rail 60 by a butt flange 72 and a pivot pin 74. Depression of the piano key lever 52 is arranged to actuate hammer 66 by means of a sticker or abstract 76 that is affixed at one end to the key lever 52 by means of a key fork 78 and a rubber grommet 80. The sticker 76 is pivotally mounted at its other end to a whip 82 by means of a pivot pin 84. The whip 82 is pivotally mounted to the main rail 60 by a whip flange 86 and a pivot pin 88; and a fly or jack 90 is pivotally mounted and spaced apart from whip 82 by a fly flange 92 in accordance with conventional practice, a pivot pin 94 being employed to achieve the pivotal mounting. A depression of piano key lever 52 causes actuation of the hammer 66 by transmitting force thereto through the fly or jack 90 and the butt knuckle 68.

A backcheck 96 is mounted on the whip 82 in upstanding relationship by means of a backcheck wire or rod 98; and a catcher 100 is secured to the butt knuckle 68 by a catcher stem or shank 102 which radiates from the butt knuckle. Upon return of the hammer 66 from striking engagement with the string 48, catcher 100 engages the backcheck 96; and desirably, there is a damped engagement of the parts provided by appropriately disposed felt pads secured respectively to the backcheck and to the catcher.

A metal spoon 104 is affixed to the whip 82 in upstanding relationship and is disposed on the end of the whip which is opposite the connection with the abstract 76. Upon actuation of the whip 82 by means of the key lever 52, the spoon 104 contacts one end of a damper lever 106, damper lever 106 being swingably mounted to main rail 60 by means of a damper lever flange 108 and a pivot pin 110. The spoon 104 is specifically arranged to operate damper lever 106 so as to retract a damper head 112 from contact with the piano string 48 immediately in advance of the hammer 66 striking the string.

The flange part

Figure 2:
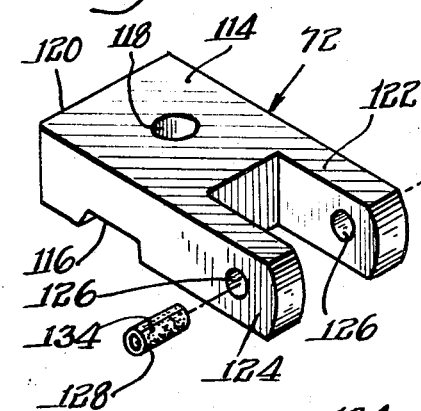
FIG. 2 is an enlarged perspective view of a flange such as is used in mounting the butt knuckle and the whip to the main rail of a piano structure, tubular bushings being shown exploded from the pivot bores of the arms which extend from the body of the flange.
Figure 3:
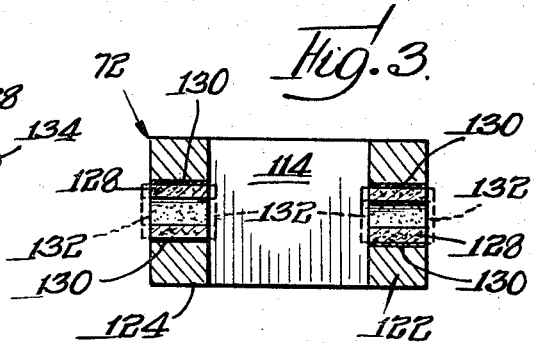
FIG. 3 is a further enlarged view of the flange of FIG. 2 taken in cross-section and showing assembly of the bushings to the flange, the amount of material trimmed from the opposite ends of the bushings being shown in exaggerated manner by broken lines.
Figure 4:
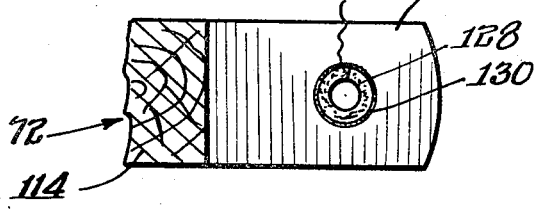
FIG. 4 is a further enlarged view of the flange of FIG. 2, being taken along the longitudinal axis of the part to show assembly of the tubular bushing in one of the arms of the flange.

Turning to a consideration of FIGS. 2-4 for a more detailed description of the butt flange 72, the intermediary support member which is defined by the flange 72 is shown to comprise a rigid body 114 which is fashioned with a transverse channel 116 and an intersecting bore 118, channel 116 and bore 118 being employed in attaching the flange to the primary support which is defined by main rail 60. Channel 116 receives a cooperatively shaped rib formed on the surface of the main rail, and the bore 118 passes a wood screw or other similar fastener into aggressive engagement with the main rail. The body 114 also includes a heel 120 at one end and a pair of spaced-apart parallel arms 122 and 124 which extend integrally from the body to cooperate in defining a pivot for the butt knuckle 68. For this latter purpose, the arms 122 and 124 are perforated with aligned bores 126, and tubular bushings 128 are situated in the bores 126 to be secured therein by adhesive material 130 best seen in FIG. 3. Ordinarily, the bushings 128 have a length greater than the length of the bores 126; and the excess material, which is indicated by the broken line showing in FIG. 3 and which is designated by the numeral 132, is trimmed off so that the ends of the bushings are flush with the sidewalls of the corresponding arms of the flange part.

The body 114 and the arms 122 and 124 are fabricated from a rigid, ordinarily porous material such as wood, the wood of the sugar maple tree being commonly employed in this regard. Furthermore, the bushings 128, in the embodiment of FIGS. 2–4, are fabricated from a resilient, porous bearing material such as felt, the individual bushings 128 comprising an abbreviated strip of felt which is rolled to tubular form and which has its opposite ends disposed in edgewise abutting relationship to form a seam 134. As will be recognized, the central aperture in the tubular bushing forms a bore for receiving a portion of the pin 74 that is used in mounting the butt knuckle 68 to the flange 72. Because of the relatively porous nature of both the bushing material and the flange material, it has proved advantageous to provide means for retaining a portion of the adhesive 130 against the absorbent action of these porous materials, particularly when the adhesive is in a liquid state. Therefore and in compliance with an important feature of the invention, the surface of each of the bores in the flange part is provided with a groove for receiving a rib of adhesive material in addition to the film of adhesive material which is coated around the remaining portions of the surface of the bore.

A modified flange 72a is shown in FIG. 5 to incorporate a spiral groove 136 in each of the bores 126a. Moreover, it will be noted that the grooves 136 collect ribs 138 of adhesive material upon a coating of the surface of the bores with the adhesive material. Provision of the groove for collecting such a rib of adhesive material assures positive connection of the tubular bushing to the walls of the bore, and this secure attachment prevents the bushing from working loose and eventually out of the flange with the resultant undesirable effect on the actuation of the corresponding hammer. Furthermore, fashioning the grooves 136 in spiral form enhances the attachment of the bushing by insuring points of attachment around the entire periphery of the bushing and along its length, the pitch of the spiral groove being selected to make at least one complete turn in its traverse of the bore 126a.

A further modified form of the flange part of the invention is shown in FIG. 6 where a flange 72b is shown to be perforated with a bore 126b at an arm thereof for receipt of a tubular bushing 128b. The flange 72b is particularly distinguished by arranging the abutting edges of the material forming the bushing 128b to possess an angled relationship whereby to form a spiral juncture 140. This angled relationship of the abutting edges is readily accomplished by bias cutting the ends of the strip of bushing material. So arranged, the juncture 140 takes a generally spiral form traversing the received portion of the pivot pin 74b diagonally with respect to the longitudinal axis thereof. This type of juncture prevents the pivot pin from entering the fissure between the abutting edges during use of the parts. Such an arrangement is particularly important when the bushing 128b is fabricated from a resilient material such as felt and when both the pivot pin and the flange are formed of rigid materials such as metal and wood respectively. Were the pin to work itself into the fissure between the abutting edges of the strip of bushing material, undesirable looseness or rattling in the operation of the butt knuckle and attached hammer would result.

Bushing machine—general description

In particular accord with the present invention, tubular bushings are formed and assembled to the flange parts in a rapid, automatic and economical manner. These objectives are achieved in the machine disclosed in FIGS. 7–23; and with reference to FIG. 7, the numeral 142 is used for generally designating this machine. The machine 142 includes a table or platform 144; and a guide bar assembly 146 is situated on top of the platform 144 generally adjacent one edge thereof. The machine 142 also includes a supply hopper 148 of the vibrator type which delivers flange parts 72 to the guide bar assembly, machine 142 additionally including a storage or holding hopper 150 which receives flange parts from the guide bar assembly. Intermediate the hoppers 148 and 150 and laterally aligned with the guide bas assembly 146 are grooving apparatus 152, dispensing apparatus 154, bushing assembly apparatus 156, and bushing shaping apparatus 158. Furthermore, trimming apparatus 160 is included in the machine 142 processwise subsequent to the hopper 150.

Turning to FIG. 9, the guide bar assembly 146 is seen to comprise a pair of floor members or support rails 162 which are spaced apart to define a channel 164. The floor members 162 supportingly receive a number of the flange parts 72 in slidable relationship; and the guide bar assembly 146 additionally incorporates side members 166 which rise from a piston adjacent the outside lateral surfaces of the floor members 162 to direct movement of the flange parts in a predetermined spatial orientation from the hopper 148 to the hopper 150. The lower edges of the side members 166 flare outwardly to define the sidewalls of a housing 168. Top rails or roof bars, not shown, may also be included for total restraint of the flange parts in the path defined by the guide bar assembly 146.

In accord with the invention, cyclically operable means are provided in conjunction with the guide bar assembly 146 for progressively and incrementally transporting the flange parts through the guide means generally from the hopper 148 to the hopper 150. These means include a transfer bar 170 which is disposed generally within the housing 168 to operate in the channel 164 defined by the floor members 162. The transfer bar 170 is adapted to be raised and lowered and to be oscillated horizontally for transporting the flange parts 72 along the guide bar assembly 146 in a progressive and incremental manner, and to facilitate this operation, transfer dogs 172 are raised from the upper surface of the bar 170 at horizontally spaced intervals as will be seen by reference to FIGS. 7 and 8. These transfer dogs abut the heels 120 of the flange parts 72 during the forward horizontal stroke of the transfer bar 170, the end of each stroke of movement defining a rest position for the flange parts. At these rest positions, work operations are performed while the transfer bar 170 is recycling.

The transfer bar 170 is arranged to be manipulated by a cam drive indicated generally in FIG. 8 by the numeral 174; and this cam drive comprises a horizontal drive scheme 176 and a spaced pair of vertical drive schemes 178. Motive power for these two drive schemes is supplied by an electric motor 180, and the energy from motor 180 is applied to a drive shaft 182 through a speed reducing gear train 184. Shaft 182 is journaled in bearings 186 which are mounted in standards 188, 190 and 192.

The horizontal drive scheme 176 includes a barrel cam 194 which is fashioned with a cam groove 196 and which is mounted on a shaft 198 for rotation, shaft 198 being journaled in bearings 200 which are secured in the upper ends of standards 190 and 192. A sprocket 202 is fastened to the shaft 198 in vertical alignment with a sprocket 204 that is secured to the drive shaft 182 whereas an endless chain 206 extends between the sprockets 202 and 204 for communicating rotational power to the barrel cam 194. A cam follower 208 is affixed to the transfer bar 170 in depending relationship to ride in the cam groove 196 of the barrel cam in order to achieve horizontal oscillation of the transfer bar upon rotation of the barrel cam. The length of the follower 208 and the depth of the cam groove 196 are selected to accommodate the vertical movements of the transfer bar without disengagement of the follower 208 from the groove 196. Advantageously, the follower 208 is of the roller type in order to facilitate movement of the transfer bar 170.

The vertical drive schemes 178 comprise arrangements of similar parts; and each of these horizontal drive schemes includes an enlargement or end cap 210 secured to the upper end of a vertically reciprocable shaft 212. Extending laterally from each of the end caps 210 is a roller 214 which operates in a laterally opening groove 216 formed in one sidewall of the transfer bar 170. The length of the grooves 216 is selected to accommodate horizontal movement of the transfer bar 170 without interfering with the related vertical movements thereof.

Each of the shafts 212 is slidably received in a bearing 218, and the bearings 218 are fastened respectively to the standards 188 and 192 for insuring proper vertical movement of the shafts 212. A disc cam 220 is fastened to the drive shaft 182 underlying each of the vertical shafts 212, and a roller-type follower 222 is rotatably mounted to the lower end of each of the shafts 212 by a yoke 224, the followers 222 riding on the cam surfaces of the disc cams 220 for raising and lowering the shafts 212 and thereby the transfer bar 170 in accordance with the valleys and rises cut into the disc cams 220.

The transfer bar 170 is illustrated in FIG. 8 at its uppermost vertical position and its forwardmost horizontal position considering its path of horizontal movement to be generally from left to right as viewed in the figure. From this position, the rotation of drive shaft 182 will turn the rises of disc cams 220 from out of alignment beneath the rollers 222; and under the influence of gravity, the transfer bar 170 will thereupon descend until the transfer dogs 172 are lowered out of contact with the flange parts 72. Thereafter, the rotation of barrel cam 194 will act on the transfer bar through the follower 208 to retract the transfer bar from the right to the left as viewed in FIG. 8; and as the transfer bar 170 reaches its rearmost position, rises on the disc cams 220 will again be approaching engagement with the followers 222 to raise the shafts 212 and thereby the transfer bar 170 into position behind the heels 120 of the several flange parts disposed in the guide bar assembly 146. Thereafter, rotation of barrel cam 194 acts on follower 208 to transport the bar 170 to its forwardmost position thereby incrementally moving the flange parts by a distance corresponding to the spacing between the rest positions of the parts in the guide bar assembly.

Before leaving FIG. 8, it is to be noted that the forward end of the transfer bar 170 actuates a limit switch 226 upon achieving the forwardmost position. The limit switch 226 senses the fact that the flange parts 72 have been brought to rest, energizing thereupon circuits to various drives and control units employed in the machine 142, including the actuating mechanism for a parts delivery jack or cylinder 228. Thus, various work operations may be performed on the flange parts in the guide bar assembly 146 while the parts are at rest. Moreover, the parts delivery jack 228 is actuated to lever a flange part into the guide bar assembly from a track 230 that leads from the supply hopper 148 before the transfer bar 170 is raised in its rearwardmost position.

Returning to FIG. 7, it is to be observed that rest positions of the flange parts 72 are defined at the locations indicated by the numerals 232, 234, 236 and 238. From the standpoint of manufacturing process flow, the flange parts 72 progress from one to another of these rest positions in general accordance with the numerical value of the respective designations; and the work performed includes, in sequence, the cutting of grooves in the pivot bores of the arms of the flange parts, the application of adhesive material to the previously formed grooves and to the remainder of the surface of the pivot bores, the insertion of a tubular bushing in the adhesive-wet pivot bores, and the sizing of the central aperture in the bushing with a concomitant smoothing of the bushing material into contact with the adhesive-wet surface of the bores in which they are inserted.

After the sizing and shaping operation has been performed at rest position 238, the individual flange parts are passed from the guide bar assembly 146 to a track 240 that leads to the vibrator hopper 150. Suitable elevator means may be provided for raising the parts along the track 240 to the top edge of hopper 150. Alternatively, the advancing action of the transfer bar 170 may be combined with a one-way stop for pushing the parts in a train along the track 240. The hopper 150 defines a holding chamber in which the individual flange parts are retained while the adhesive material is setting or curing permanently to affix the tubular bushings in the respective arms of the individual flange parts. Therefore, the track 240 advantageously traces a spiral path about the exterior of the hopper, and an abutment blade 242 is disposed adjacent the top of the spiral track to dump the parts into the interior of the hopper. An exit track 244 spirals up the interior wall of the hopper 150 to terminate in a declined, straight portion 246 that leads to the trimming apparatus 160, the usual guide fingers being arranged with the track 244 for orienting the parts that are eventually passed to the track portion 246.

The trimming apparatus 160 is intended to perform a final finishing operation on the individual flange parts, specifically the trimming of the ends of the tubular bushings and the removing of both excess flange part material from the arms of the flange parts and dried adhesive exuded about the ends of the tubular bushings. With reference to FIGS. 7 and 10, the trimming apparatus 160 is therefore arranged to include two pairs of spaced cutter elements 248 for movement into incising engagement with the arms of a properly positioned flange part. The cutter elements 248 comprise circular, saw-like blades with fluted depressions flaring from the cutting edge thereof. The cutter elements 248 are fixedly mounted on a shaft 250 that is journaled in the corresponding ends of a pair of arms 252 and 254. The respective cutter elements 248 of each pair are properly spaced to admit an arm of one of the flange parts therebetween, and the innermost or proximal cutter elements are precisely spaced for accurately sizing the distance between the confronting surfaces of the arms of each flange part.

An electric drive motor 256 is secured between the opposite ends of the arms 252 and 254, and pulleys 258 and 260 are fastened respectively to the output shaft or motor 256 and the cutter element shaft 250. A V-belt 262 is employed in communicating the pulleys 258 and 260 for rotating the cutter elements 248. The assembly comprising the motor 256, the cutter elements 248 and the arms 252 and 254 is pivoted on stub shafts 264 which extend from the arms 252 and 254 to be received in bearings 266 that are mounted on the platform 144 as is best shown in FIG. 1. As is indicated in FIG. 10, a suitably actuated jack or cylinder 268 operates between platform 144 and arm 252 for pivoting the cutter elements 248 into and out of incising engagement with a flange part 72 positioned against a stop plate 270.

The stop plate 270 is situated laterally of the exit end of the track portion 246 which leads from hopper 150; and aligned with the stop plate 270 is a suitably actuated jack or cylinder 272, cylinder 272 having an extensible and retractable piston 274 that is operable to transfer individual flange parts from the track portion 246 to a position abutting the stop plate 270. The piston 274 is extended to hold a flange part 72 against the stop plate 270 while the cutter element 248 are swung into incising relationship with the arms of the flange part so held. At the same time, the piston 274 serves to obstruct the exit end of the track portion 246 preventing the flange parts from escaping therefrom. An exit passageway 276 underlies the position of the flange part adjacent stop plate 270 whereby to permit the finished parts to fall under the influence of gravity to a collection bin therebeneath upon completion of the trimming operation and upon release of the part by retraction of the piston 274.

Continuing now with sole reference to FIG. 7, the grooving apparatus 152 is seen to include a reversible electric motor 278 which is arranged to drive a lead screw 280 through a pinion gear 282, a meshing spur gear 284 and a nut 286 that is affixed to the spur gear. Bearings 288 and 290 are secured to the platform 144 by suitable brackets to hold the spur gear and attached nut against movement axially of the lead screw 280 whereby to insure proper movement of the lead screw under the driving influence of motor 278.

The lead screw 280 is disposed laterally of the rest position 232 in order to situate a tap 292 in alignment with the pivot bores of a flange part located at the rest position 232, tap 292 being mounted to the lead screw 280 by a chuck 294. The tap 292 is selected to possess a length sufficient to penetrate through both of the arms of a flange part disposed at rest position 232; and it is important to recognize that the lead screw 280 is arranged with the reversible drive motor 278 so that the groove or rifling formed in the pivot bores of the flange part upon advance of the tap 292 is not damaged upon retraction of the tap. It is also realized that the speed of axial movement of the lead screw as well as the pitch thereof can be adjusted to vary the pitch of the groove or rifling formed in the pivot bores of the flange parts. If desired, the lead screw 280 may be advanced and retracted by a suitably actuated jack or cylinder. Moreover, it is contemplated that the pivot bores of the flange parts may be serrated as with a broaching tool.

Bushing Machine—Adhesive Dispensing Apparatus

Continuing in the path of process flow, the dispersing apparatus 154 is shown in FIG. 7 to be situated laterally of the guide means 146 at the rest position 234, the dispensing apparatus specifically including a pair of dispenser bodies 296 mounted respectively on the opposite sides of the guide bar assembly 146. An applicator piston 298 is slidably mounted in each of the dispenser bodies 296 in alignment with the position of the pivot bores of the flange part at the rest position 234. The dispenser bodies 296 and the applicator pistons 298 are intended for use in applying adhesive material to the surface of the pivot bores of a flange part situated at the rest position 234; and turning to FIGS. 20–23 for a more detailed description of the dispensing apparatus 154, the dispenser bodies 296 are seen to be mounted on slide plates 300 for movement toward and away from the flange part 72 which is at repose therebetween. The slide plates 300 reside on a housing 302 that is situated on platform 144; and advantageously, the slide plates and housing are arranged for directed movement of the slide plates as by the provision of a dove-tail slide acting therebetween.

Converging movement of the slide plates 300 and therefore the dispenser bodies 296 is incurred by suitable means such as by lever arms 304 and 306 which are pivotally mounted respectively to ears 308 and 310, ears 308 and 310 being dependingly attached to the platform 144. Stub shafts 312 are usefully employed in this pivotal mounting. The lever arms 304 and 306 are coupled by a pin 314 at a position generally underlying the guide bar assembly 146 beneath platform 144; and the apertures formed in the respective lever arms for receiving the pin 314 are desirably formed oversize or to elliptical shape in order to permit a selected degree of relative movement for purposes of facilitating the swinging action of the lever arms about the stub shafts 312. An adjustable stop post 316 is desirably fastened to the underside of platform 144 in alignment with the coupled ends of the lever arms 304 and 306 in order to limit or define the widest spacing of the upper ends of these lever arms. A tension spring 318 acts between the lever arm 306 and an extension 320 of the lever arm 304 to bias the coupled ends of the lever arms against the stop post 316, thereby directing the upper ends of the respective lever arms normally into diverging relationship. A cam follower 322 of the roller type is rotatably mounted to the lower end of extension 320 to cooperate with a disc cam 324 in causing a converging of the upper ends of the lever arms 304 and 306. Advantageously, the disc cam 324 is fixed on the drive shaft 182 for rotation therewith.

Spaced beneath the extremities of their upper ends, the lever arms 304 and 306 are connected to the slide plates 300 by eye-bolts 326. The eye portion of each of the bolts 326 is pivotally mounted to the respective slide plate by a stud or other suitable element while the threaded end passes through a smooth walled bore in the respective lever arm to receive a nut 328 and a locknut 330 thereover. A return spring 332 is passed over each of the eye-bolts 326 between the eye thereof and a recess 334 formed in the respective lever arm, springs 332 acting to cushion the engagement of the lever arms with the slide plates and serving to return the lever arms and slide plates to a spaced relationship upon cam 324 rotating to permit spring 318 to return the lever arms to diverged relationship.

Adjustable abutments 336 are provided on the ends of slide plates 300 for engagement with the cooperating lever arms; and somewhat similar adjustable abutments 338 are secured to the upper ends of the lever arms for operating the dispenser means comprising the bodies 296 and pistons 298.

A guide block 340 is mounted on each of the slide plates 300 spaced generally between the dispenser body 296 and the abutment 338, guide block 340 slidably receiving a shaft 342. The shaft 342 is aligned with the respective abutment 338 to be contacted and moved thereby. The shafts 342 also extend from the guide blocks 340 in the general direction of the dispenser bodies 296 for purposes of actuating the applicator pistons 298.

With reference to FIG. 23, a guide block 340 is seen to be hollowed with a recess 344 that encompasses the shaft 342. In this recess, a compression spring 346 is disposed surrounding the shaft 342 and abutting a cross pin 348 which is fixed in the shaft 342. A centrally apertured plug 350 threadedly engages the open end of recess 344 to stop the spring 346 while slidably passing the shaft 342.

Continuing with reference to FIG. 23, the dispenser body 296 is seen to be fashioned with a supply cavity 352 that is adapted to receive adhesive material under pressure from a flexible supply line 354, line 354 communicating the cavity 352 with an adhesive material reservoir, not shown. The body 296 is also provided with a threaded aperture 356, and a nose member 358 is cooperatively threaded in order to be assembled into the aperture 356. The nose member 358 thus forms a portion of the dispenser body 296. The nose member 358 is drilled and reamed with a guide bore 360 which communicates exteriorly of the dispenser body and with a counterbore 362 that opens the guide bore 360 to the cavity 352.

In horizontal alignment with the bore 360, the cavity 352 is provided with a perforated wall 364, wall 364 being centrally apertured slidably to pass the applicator piston 298 and being apertured radially outwardly from the central aperture with a series of holes 366. The holes 366 open into a cavity 368 which is formed in the dispenser body 296 in generally horizontal alignment with the counterbore 362 of nose member 358, and the cavity 368 is closed by means of a rubber diaphragm 370, a ring 372 and screws 374. The applicator piston 298 is coupled to diaphragm 370 at the center thereof and in alignment with shaft 342 by means of a connector 376. A compression spring 378 is disposed surrounding the piston 298 between the connector 376 and the wall 364 in order to bias the applicator piston generally toward the shaft 342.

The dispensing apparatus 154 is arranged for accurate metering of adhesive material from the supply cavity 352 to the pivot bore 126 of the individual flange parts. The apparatus 154 is also arranged to avoid the accumulation of excess or wasted adhesive material in and about the corresponding work station. For these purposes, each of the nose members 358 is provided with an exterior annular shoulder portion 380 which surrounds the corresponding guide bore 360 to define an abutment for sealingly engaging a sidewall of a flange part encompassing the pivot bore therein upon movement of the dispenser body toward the flange part. This sealing action of the shoulders 380 is well illustrated in FIG. 21.

Furthermore, each of the applicator pistons 298 includes a head 382 at its outer end and a reduced diameter portion 384 inwardly from the head 382, the reduced diameter portion defining an annular recess for carrying quantities of adhesive material generally from the supply cavity 352 to a pivot bore of a flange part upon extension of the applicator piston from the dispenser body and into the pivot bore. This function is also best seen in FIG. 21. It is to be observed that the head 382 is fashioned closely to approximate the size and shape of the pivot bore whereby to wipe excess adhesive material from the surface of the pivot bore upon retraction therefrom and in order to provide a stop tending to obstruct passage of adhesive material beyond the inner margin of the pivot bore of the flange part. Advantageously, the heads 382 are provided with tapered shoulders 386 as is shown in FIG. 21. These tapered shoulders lead adhesive material to the inner margins of the pivot bore with a minimum tendency for the adhesive material to extrude out around the head 382.

Having thus disclosed the construction of the dispensing apparatus 154, it will be valuable now to describe its mode of operation. With reference first to FIG. 20, rotation of the disc cam 324 eventually causes the rise thereof to engage the follower 322. A converging of the lever arms 304 and 306 and thereby a converging of the abutments 338 results. As the lever arms 304 and 306 converge, a point is eventually reached at which the abutments 336 are contacted by the confronting surfaces of the respective lever arms; and thereupon, further converging movement of the lever arms causes the slide plates 300 to approach the flange part 72 which is positioned between the dispenser bodies 296. The corresponding movement of the dispenser bodies 296 urges the shoulders 380 of the nose members 358 into sealing engagement with the sidewalls of the flange part surrounding the pivot bores therein as is shown in FIG. 21. Next, the abutments 338 are directed into engagement with the outer ends of the shafts 342 causing the shafts 342 to engage the connectors 376. Further converging movement of the lever arms extends the applicator pistons 298 from the respective dispenser bodies and into the respective pivot bores of the flange part positioned therebetween. When the heads 382 have emerged from the pivot bores of the flange part and into the space between the arms thereof, adhesive material from the cavity 352 is exposed to the entire surface of the pivot bores due to the annular recess defined by the reduced diameter portions 384. The flange part, being formed of a porous material, acts to take up portions of this adhesive material through capillary action.

As the rise of disc cam 324 passes out of engagement with the follower 322, the lever arms 304 and 306 are released to the return action of spring 318; and with the concomitant retraction or diverging of the upper ends of the lever arms and therefore the abutments 338, the shafts 342 are released to the return action of springs 346. The applicator pistons 298 are correspondingly released to the return action of springs 378. As a result, the heads 382 are drawn back into the respective dispenser bodies; and as these heads pass through the respective pivot bores in the flange part, they act to wipe excess adhesive material from the surfaces of the pivot bores and into the dispenser bodies. An accurately metered adhesive film 130 is thereby deposited in the pivot bores of the flange part as will be seen in FIG. 22. The retraction of the heads 382 into the guide bore of the dispenser body is achieved in continuance of abutting engagement between the shoulders 380 and the confronting walls of the flange part whereby to avoid discharge and waste of the adhesive material. A messy condition at the dispensing apparatus 154 is concomitantly avoided.

Eventually, the rise of disc cam 324 is rotated completely out of engagement with the follower 322; and during the final portions of the diverging action of the lever arms 304 and 306, the eye-bolts 326 act to retract the slide plates 300 and thereby retract the dispenser bodies 296 from abutting engagement with the flange part. Of course, springs 332 serve to establish and maintain a selected spacing of the abutments 336 from the respective lever arms upon such retraction, correspondingly positioning the slide plates 300 and the dispenser bodies 296. Passage of the rise of disc cam 324 from follower 322 completes the cycle of operation of the dispensing apparatus 154.

Bushing machine—bushing assembly apparatus

Reference now should be had to FIGS. 11–19 for the following detailed descriptions of the bushing assembly apparatus 156. Considering FIG. 17 first, the apparatus 156 is seen to include similar combinations of components disposed symmetrically with respect to and generally laterally of both a flange part 72 and the guide bar assembly 146. Apparatus 156 is provided for the purpose of inserting tubular bushings in the pivot bores formed in the arms of the flange part. More specifically, a suitably actuated cylinder or jack 388 is mounted on a horizontal plate 390 with the axis of its piston 392 aligned with the axis of the pivot bores of the flange part disposed at the rest position 236. A cylinder 388 is disposed on each lateral side of the flange part, and a guide block 394 is mounted on the plate 390 for use in directing the reciprocal action of the corresponding piston 392.

A delivery arrangement 396 is cooperatively arranged with each of the cylinders 388 for situating a tubular bushing in coaxial alignment with the location of the pivot bores of the flange part at the rest position 236. Each of the delivery arrangements 396 includes a preliminary forming member 398, a selectively operable cutter member 400, a repositionable transfer member 402, and a bushing material transport assembly 404. A vertically reciprocable forming tool 406 is arranged to cooperate with each of the transfer members 402 as will be described more fully hereinafter.

Continuing with reference to FIG. 17 and with secondary reference to FIGS. 18 and 19, the preliminary forming member 398 is seen to comprise a forming block 408 in which there is fashioned a cylindrical passageway 410. A continuous strip 412 of bushing material is fed from a supply roll 414 and over a guide roller 416 to be delivered to the passageway 410. The roller 416 is rotatably mounted to the block 408 by means including a bracket 418, and it will be observed with reference to FIGS. 18 and 19 that the roller 416 acts to align the strip of bushing material with the axis of the passageway 410 while the cylindrical shape of the passageway, particularly at the opening thereof, serves to receive and fold a portion of the strip 412 generally about the longitudinal axis thereof, the strip of bushing material within the passageway 410 being formed into a generally convex shape, appearing in generally inverted U-shape in cross-section as will be seen in FIG. 19.

The forming block 408 is cut away to define a chamber 420 opening from a medial portion of the passageway 410 in a generally downward direction, chamber 420 permitting access of the transport assembly 404 to the strip 412 of bushing material contained within the passageway. This is best shown in FIG. 18. The bushing material transport assembly 404 includes a finger 422 that displays a saw-toothed edge to the strip 412 of bushing material, finger 422 being carried by a slide plate 424 for horizontally reciprocable movement within the chamber 420. The finger 422 is pivoted to the plate 424 by pin 426 at a position disposed eccentrically from the teeth formed on the upper end of the finger, and a leaf spring 428 is mounted on the plate 424 opposite the pivot pin 426 to bias the toothed portion of the finger 422 into engagement with the roof of the folded strip of bushing material. The teeth formed on the finger 422 are slanted generally in the direction indicated by arrow 430, that is, in the direction of bushing material travel; and this slanting of the teeth cooperates with the pivotal mounting of the finger and the bias of spring 428 to cause the finger to grip the strip of bushing material upon the plate 424 being moved in the general direction of arrow 430. This slanting of the teeth also permits the toothed portion of the finger to slide over the strip of bushing material upon movement of the plate 424 in the opposite direction.

In order to impart horizontally reciprocable movement to the finger 422, the plate 424 is fashioned with a socket 432 which is adapted to receive a ball 434, ball 434 being mounted on one end of an arm 436. Since there is a pair of the delivery arrangements 396 as has been described hereinabove, there are of course two of the arms 436; and returning to FIG. 17, these arms 436 are seen to be individually pivotally mounted to a support plate 438 by pivot pins 440. At their lower ends, the arms 436 carry cam followers 442 which are desirably of the roller type. These followers ride on the edge of a disc cam 444 which is secured to the drive shaft 182 for rotation therewith, and the disc cam 444 is provided with diametrically disposed rises 446 which are arranged to actuate the arms 436 upon simultaneously engaging the respective followers 442. A tension spring 448 is connected between the arms 436 generally intermediate followers 442 and pins 440 for biasing the followers into contact with the edge of disc cam 444 and for biasing the plates 424 generally toward the rollers 416. Accordingly, the normal or rest position of the fingers 422 is at ready for advance of the bushing material. Threaded stop studs 450 are passed through cooperatively threaded bores formed in the arms 436 to abut a stop block 452 and to be adjustably positioned by locknuts 454, the studs 450 acting to limit the converging action realized by the spring 448.

Considering FIG. 17 in conjunction with FIG. 11, each of the transfer members 402 is seen to comprise a circular plate 456 that is joined to a hub 458. The plates 456 are arranged to be repositionable in order to deliver a piece of the strip 412 of bushing material from the assembly 404 to a position in alignment with the location of the pivot bores of a flange part at rest position 236. Therefore, the circular plates 456 are attached to a shaft 460 by means of the hubs 458 for rotation through discrete intervals. A collar 462 is advantageously interposed between the circular plates 456 as is best seen in FIG. 17; and the shaft 460 carries a spur gear 464 on one end, gear 464 meshing with a rack 466 that is reciprocated by a suitably actuated jack or cylinder 468. As will be described more fully hereinafter, the circular plates 456 are fashioned with diametrically arranged pockets; and therefore, the jack 468 is actuated to rotate the plates 456 in reversible fashion through an arc of 180°, thus transferring the pockets in the circular plates 456 between the alternate positions defined by the bushing material transport assembly 404 and the rest position 236. It is recognized that the jack 468, the rack 466 and the gear 464 may be replaced by a drive arrangement including a continuously running motor and a periodically energizable clutch.

The circular plates 456 are similarly constructed and arranged and are, as is well shown in FIGS. 12 and 14, fashioned with radially outwardly opening notches or pockets 470. As will be seen with reference to FIG. 11, the pockets 470 are situated across a diameter of the circular plate 456; and as is shown in FIG. 15, the plates 456 are formed to take a thickness corresponding to the length of a short strip or piece 472 of bushing material which is to be cut from the strip 412.

Considering FIG. 15 in conjunction with FIG. 18, it is seen that the bushing material transport assembly 404 delivers the strips 412 of bushing material from the rollers 416 and through the passageways 410 to the lowermost position of the pockets 470. With the ends of the strips 412 thus positioned in the pockets 470, the cutter member 400 is actuated to sever the short strips 472 of bushing material which are located within the pockets 470. As is best seen in FIG. 11, the cutter member 400 includes a pair of blades 474, each of which is fashioned with a sharpened edge 476. The blades 474 are mounted on a carrier 478 that is slidably received in a channel 480. Moreover, the blades 474 are mounted on the carrier 478 so that the sharpened edges 476 are inclined from the horizontal in such a manner that the bushing material is trapped within the pocket 470 upon advance of the blades 474 into incising engagement therewith. This is best shown in FIG. 14. It is to be also noted, with reference to FIG. 15, that the sharpened edges 476 of the blades 474 are beveled only on one side so that the actual cutting edges are approximately coincident with the adjacent surfaces of the cooperating circular plate 456. The described arrangement insures accurate cutting of the pieces 472. Both of the blades 474 are mounted on the carrier 478; and returning to FIG. 11, the carrier 478 is attached to a piston 482 which extends from the body of a cylinder or jack 484, jack 484 being suitably actuated for reciprocation of the piston 482 and therefore the carrier 478 and the blades 474.

After the pieces 472 have been severed from the strips 412, they assume a generally U-shaped form, as is shown in FIG. 14; and the resiliency of the bushing material combines with its frictional properties to hold the pieces 472 in the pockets 470 while the circular plate 456 is rotated to bring the pockets 470 into alignment with the pivot bores of the flange part which is located at the rest position 236. With the pockets 470 thus repositioned, the vertically reciprocable forming tools 406 are urged downwardly; and as will be seen in FIG. 12, each of the tools 406 includes a narrowed end portion 486 that is adapted slidably to enter the corresponding pocket 470. The end portion 486 terminates in a tip 488 that is fashioned with a concave recess for use in forming the U-shaped piece 472 into cylindrical form. A jack 490 is mounted on a pedestal 492 as is shown in FIG. 11; and the extensible and retractable piston 494 of the jack 490 is attached to the tools 406 by a mounting 496, actuation of the jack 490 serving to reciprocate the tools 406 vertically into and out of cooperative engagement with the pockets 470.

Considering FIG. 13, it is particularly important to note that the pockets 470 are aligned with the pivot bores 126 of the flange part 72 at the rest position 236; and in addition, when the reciprocable forming tools 406 are urged downwardly to shape the pieces 472 into tubular form, the resultant tubular bushings are aligned coaxially with the pivot bores of the flange part. With the bushings so positioned, the pistons 392 are urged into converging relationship to drive the bushings into the pivot bores of the flange part as is shown in FIG. 16. Advantageously, each of the pistons 392 terminates in a pin 498 which is sized to pass readily between the tip 488 of the forming tool and the floor or root of the pocket 470.

From the immediately foregoing descriptions, it is apparent that the bushing assembly apparatus 156 produces the tubular bushings 128 from the strips 412 of bushing material. The strips are first formed to a preliminary shape in the passageways 410 and are thereafter delivered to the pockets 470 of the plates 456. Thereafter, the cutter members 400 are actuated to sever the pieces 472, whereupon the plates 456 are repositioned angularly by being rotated through an arc of 180° to dispose the pieces 472 in alignment with the pivot bore locations at the rest position 236. Next, the reciprocable tools 406 are caused to descend, forming the pieces 472 into tubular shaped bushings which are driven into the pivot bores of a flange part 72 by the action of pistons 392. Upon retraction of the forming tools 406, and desirably upon retraction of the pistons 392, the transfer bar 170 is again positioned with a transfer dog 172 in transportable engagement with the heel of the now bushed flange part. This is indicated in FIG. 16. The transfer bar 170 is then actuated to deliver the flange part 72 from the bushing assembly station to the bushing shaping station.

Returning to FIG. 7, the bushing shaping apparatus 158 is seen to comprise a tool 500 which tapers to a point at one end and which is secured in a chuck 502 at the other end. The tool 500 is positioned in axial alignment with the location of the pivot bores of the flange part at rest position 238, and the tool is attached to a lead screw 504 that is disposed laterally of the guide bar assembly 146 adjacent the rest position 238. In order to reciprocate tool 500, the lead screw 504 is fastened to the end of the extensible and retractable piston of a suitably actuated jack or cylinder 506; and a stationary nut 508 threadedly receives the lead screw 504 in order that the tool 500 will be rotated upon advance and withdrawal of the lead screw 504. Advantageously, the lead screw is attached to the piston of jack 506 by a coupling unit 510 which is suitably arranged to secure the lead screw to the piston while permitting rotation therebetween.

The tool 500 is arranged for movement into and out of the central aperture in the tubular bushings previously assembled in the pivot bores of the flange part whereby to size the aperture and smooth the bushing material into substantially uniform contact with the adhesive coated surfaces of the surrounding pivot bore; and pursuant to this objective, it has proved advantageous to select the tool 500 to have a sufficient length to pass through both arms of the flange part 72 and perform these operations on both of the tubular bushings carried by the flange part. After this sizing and smoothing operation has been performed by the apparatus 158, the flange parts are delivered by the transfer bar 170 to the track 240 for the purposes and in the manner described hereinabove.

Modified machines

While a particular embodiment of the bushing machine of the invention has been thus far shown and described, it should be understood, of course, that the invention is not strictly limited thereto since many modifications may be made. In order to enhance the understanding of the invention, several modifications are therefore shown and will now be described. Since certain similarities exist between the machine disclosed in FIGS. 7–23 and the modified embodiments, like numerals have been used to designate like parts, the suffix letter "c" being employed to distinguish those parts associated with the embodiment of FIG. 24, the suffix letter "d" being employed to distinguish those elements associated with the embodiment of FIG. 25, and the suffix letter "e" being employed to distinguish those elements associated with the embodiment of FIGS. 26–27.

With reference to FIG. 24, the modified embodiment of the machine of the invention which is disclosed therein is characterized by the fact that the bushing shaping apparatus 158 is replaced by a pinning apparatus 512, a heating apparatus 514 and a pin removal apparatus 516. In this modified embodiment of the invention, a thermally conductive pin 518 is driven into the central apertures of the bushings 128c which have been assembled to the arms of a flange part 72c in a preceding step in the process flow. This temporary pin is subsequently heated by the apparatus 514 to iron out the bushing material, to smooth out wrinkles therein and to accelerate drying of the adhesive material by which the tubular bushings are secured in place. Thereafter, the temporary pins are removed by the apparatus 516. Whereas the pinning apparatus 512 is situated at rest position 238c, the heating apparatus 514 and the pin removal apparatus 516 are situated at subsequent rest positions, rest positions 520 and 522 respectively.

The operation performed by the apparatus 512, 514 and 516 improves the bearing properties of the tubular bushings which are assembled to the individual flange parts.

The pinning apparatus 512 specifically includes a horizontal support plate 524 that is fixed in position laterally of the guide bar assembly 146c, and the plate 524 is fashioned with an upwardly opening groove 526 that is aligned with the location of the pivot bores of the flange part at rest position 238c. A transfer plate 528 slidably engages the upper surface of support plate 524 to be reciprocated by a suitably actuated jack or cylinder 530, the piston of cylinder 530 being attached to the heel of transfer plate 528. The plate 528 is formed with a slot 532 that opens from the top and the bottom of the plate for use in transferring individual pins 518 from a hopper 534 to the groove 526. The pins 518 are stored in hopper 534 with their axes parallel, and the hopper is provided with a chute portion 536 that delivers the pins one at a time to the lower end thereof for transfer by means of the plate 528. As will be recognized, when the slot 532 is retracted to a position underlying the lower end of the chute portion 536, a pin 518 drops into the slot whereupon extension of the piston from cylinder 530 transfers the plate 528 so that the slot 532 overlies the groove 526 whereupon the pin carried in the slot 532 drops into the groove. Retraction of the plate 528 allows the pin 518 to be driven into position by suitable actuation of a jack or cylinder 538, the piston of the jack 538 being extended through the groove 526 for this purpose.

The heating apparatus 514 includes a thermally conductive body 540 that is fashioned at its lower end with a transverse groove 542, groove 542 being adapted to contact and embrace a pin 518 in conductive relationship when a suitably actuated jack or cylinder 544 is operated to lower the body 540 into contact with the pin 518 that is positioned therebeneath. The body 540 contains a resistance heater 546 that is suitably energized by means including an electric cable 548.

After the cylinder 544 is actuated to raise the body 540 out of contact with the temproary pin 518, the transfer bar 170c is operated to deliver the flange part to the pin removal apparatus 516. There, a cylinder or jack 550 is actuated to extend a piston 552 into abutting engagement with the end of the pin 518, further extension of the piston 552 acting to drive the temporary pin 518 from the flange part and into a waiting tray 554. The flange parts proceed to be trimmed; and because the heat applied by body 540 serves to cure the adhesive material in a rapid manner, there is no need for interposing a hold or storage hopper between the pin removal apparatus 516 and the trimming apparatus.

While the foregoing embodiments of the bushing machine relate to the application of wet or active adhesive material directly to the pivot bores of the flange part, it is also contemplated to employ bushing material that is preliminarily coated with a dry, activatable adhesive material. In the modified embodiment disclosed in FIG. 25, the strip of bushing material from which the piece 472d has been severed is pre-coated on one surface with an activatable adhesive material. Therefore, the bushing assembly apparatus 156d is distinguished by the incorporation of a circular distributing member 556, part of which is broken away to reveal its relation with the remaining parts. A member 556 is arranged with each of the transfer plates 456d; and this distributing member is particularly located between the delivery arrangement 396d and the location of the pivot bores 126d of flange part 72d at the rest position 236d. The distributing member 556 is selected to take the form of a circular ring or annulus in order to surround the path taken by the piece 472d of bushing material upon transfer of the same from the circular transfer plate 456d to the pivot bore 126d under the direction of the piston 392d of cylinder 388d.

In addition, a suitable activator fluid is supplied to the distributing member 556 under pressure through a feed line 558, and the inner wall of the distributing member 556 is perforated with a series of apertures 560 for directing the activator fluid against the adhesive material coated on the outer surface of the piece of bushing material. Although it is convenient to employ a water soluble glue as the adhesive coating material for the bushing and to direct steam into the distributing member 556 for activating the water soluble glue, it is also contemplated to employ other adhesive materials and other activator fluids, such as for example alcohol-soluble adhesives and adhesives which incorporate two or more components which are rendered reactable by the addition of a catalyst material, the catalyst material being supplied to the distributing member 556 in pulverous form or as a solution or as a dispersion.

Suitable bushings can also be formed in the arms of the individual flange parts by other rapid and economic procedures. Accordingly, a further modified embodiment of the invention is illustrated in FIGS. 26 and 27. There, a flange part 72e is provided with tubular bushings 128e which are fabricated as short tubes of a suitable resinous plastic material. Various resinous plastic materials, for example nylon and the fluorocarbon polymers such as polytetrafluoroethylene, are usefully employed in this regard; and the tubular bushings are driven into the pivot bores 126e of the flange part in an interference fit in order properly to secure the bushings to the flange part.

Considering FIG. 27, the bushing assembly apparatus 156e is seen to be distinguished by the elimination of each of the delivery arrangements indicated by the numeral 396 in the previous figures and by the substitution of a pair of delivery arrangements 562. Each of the delivery arrangements 562 includes a stationary plate 564 that is fashioned with a slot 566, slot 566 being aligned coaxially with the location pivot bores 126e at the rest position 236e. A movable plate or transfer member 568 is slidably disposed on each of the stationary plate 564 to be reciprocated thereover by means of a suitably actuated jack or piston 570, each of the jacks 570 including an extensible and retractable piston 572 that is fixed to the heel of the corresponding plate 568.

Each of the plates 568 is fashioned with a pocket 574 that is alignable with a container member 576 at one end of the travel of plate 568 for receiving a tubular bushing from the container member. The pockets 574 are also alignable over the slots 566 to deposit tubular bushings therein. When the bushings have been deposited in the slots 566, the jacks 388e are actuated to drive the positioned bushings into the pivot bores 126e. A train of the tubular bushings is supplied to each of the container members 576 from an individual vibrator hopper 578 by a conveyor tube 580.

It is also possible to form suitable bushings in the flange parts by completely filling the pivot bores thereof with a suitable resinous plastic material and thereafter drilling and reaming a bore in the plastic material for receipt of the pivot pin. The requisite plastic material can be filled into the pivot bores by being injected therein in a molten state to be held in place until cooled and solidified. In addition, acceptable bushings or bearings may be provided by dipping or coating the pivot bores in an emulsion of polytetrafluoroethylene and thereafter reaming the bore to size and burnishing the resultant bore to smooth and shape the aperture for receipt of a pivot pin.

Other bushed parts

While the foregoing descriptions have related primarily to the provision of bushings in the piano action part known as a flange, other components may be suitably bushed by application of the principles of the present invention. For example and with reference to FIG. 28, the piano action part known as an abstract or sticker is indicated generally by the numeral 582; and one end of this part is fashioned with a tongue 584 that is perforated with a bore 586. It is contemplated to modify the machine of the invention to insert a tubular bushing 588 in the bore 586 whereby to enhance the utility of the part by providing an improved bushing for receipt of the cooperating pivot pin.

Similarly and with reference to FIG. 29, a fly or jack indicated generally by the numeral 590 is seen to be arranged with opposed arms or flanges 592 at the heel thereof for use in pivotally mounting the part to a combined whip and fly flange. Each of the arms 592 is perforated with a bore 594; and it is contemplated to modify the machine previously described so that it may be used in inserting tubular bushings 596 in the bores 594, the bushings 596, in turn, receiving the pivot pin by which the fly 590 is mounted in the piano action mechanism.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. In apparatus to be used in making parts for a piano action, the combination comprising:
   (a) guide means for supporting a plurality of such parts in predetermined spatial orientation;
   (b) cyclically operable means for progressively and incrementally transporting said parts through said guide means, the end of each increment of movement defining a rest position for the parts;
   (c) dispenser means disposed laterally of said guide means at a first one of said rest positions for applying adhesive material to the surface of a pivot bore formed in each of the action parts; and
   (d) bushing assembly means disposed laterally of said said guide means at a second one of said rest positions processwise subsequent to said dispenser means for inserting a tubular bushing in the pivot bore formed in each of the action parts.

2. In apparatus to be used in making parts for a piano action, the combination comprising:
   (a) guide means for supporting a plurality of such parts in predetermined spatial orientation;
   (b) cyclically operable means for progressively and crementally transporting said parts through said guide means, the end of each increment of movement defining a rest position for the parts;
   (c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body; and
   (d) bushing assembly means disposed laterally of said guide means at a second one of said rest positions processwise subsequent to said dispenser means for inserting a tubular bushing in the pivot bore formed in each of the action parts.

3. In apparatus to be used in making parts for a piano action, the combination comprising:
   (a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide means at a first one of said rest positions for applying adhesive material to the surface of a pivot bore formed in each of the action parts, including a dispenser body mounted for movement toward and away from said first rest position and an applicator piston slidably mounted in said dispenser body, said dispenser body having an exterior shoulder adapted to define an abutment for sealingly engaging a sidewall of a said part around the pivot bore therein upon movement of said dispenser body toward said first rest position; and (d) bushing assembly means disposed laterally of said guide means at a second one of said rest positions processwise subsequent to said dispenser means for inserting a tubular bushing in the pivot bore formed in each of the action parts.

4. In apparatus to be used in making parts for a piano action, the combination comprising:

(a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body, said dispenser body having a cavity adapted to receive adhesive material, a guide bore for said piston open to said cavity and communicating exteriorly of said body, and an exterior shoulder surrounding said guide bore to define an abutment for sealingly engaging a sidewall of a said part around the pivot bore therein; and (d) bushing assembly means disposed laterally of said guide means at a second one of said rest positions processwise subsequent to said dispenser means for inserting a tubular bushing in the pivot bore formed in each of the action parts.

5. In apparatus to be used in making parts for a piano action, the combination comprising:

(a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide at a first one of said rest positions for applying adhesive material to the surface of a pivot bore formed in each of the action parts, including a dispenser body mounted adjacent said first rest postion and an applicator piston slidably mounted in said dispenser body, said applicator piston having a head at its outer end and a recess inwardly from said head for carrying quantities of adhesive material to said pivot bore upon extension of said piston from said dispenser body and into said pivot bore; and (d) bushing assembly means disposed laterally of said guide means at a second one of said rest postions processwise subsequent to said dispenser means for inserting a tubular bushing in the pivot bore formed in each of the action parts.

6. In apparatus to be used in making parts for a piano action, the combination comprising:

(a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body, said applicator piston having a head at its outer end and a recess inwardly from said head for carrying quantities of adhesive material to said pivot bore upon extension of said piston from said dispenser body and into said pivot bore, said head closely approximating the size and shape of said pivot bore whereby to wipe excess adhesive material from the surface of said pivot bore upon retraction therefrom; and (d) bushing assembly means disposed laterally of said guide means at a second one of said rest positions processwise subsequent to said dispenser means for inserting a tubular bushing in the pivot bore formed in each of the action parts.

7. In apparatus to be used in making parts for a piano action, the combination comprising:

(a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body, said dispenser body having a cavity adapted to receive adhesive material and a guide bore for said piston open to said cavity and communicating exteriorly of said body, said applicator piston having a head at its outer end and a recess inwardly from said head for carrying quantities of adhesive material from said cavity to said pivot bore upon extension of said piston from said dispenser body and into said pivot bore; and (d) bushing assembly means disposed laterally of said guide means at a second one of said rest positions processwise subsequent to said dispenser means for inserting a tubular bushing in the pivot bore formed in each of the action parts.

8. The combination according to claim 5 wherein said recess is annular.

9. In apparatus to be used in making parts for a piano action, the combination comprising:

(a) guide means for supporting a plurality of such parts in predetermined spatial orientation;

(b) cyclically operable means for progressively and incrementally transporting said parts through said guide means, the end of each increment of movement defining a rest position for the parts;

(c) dispenser means disposed laterally of said guide means at a first one of said rest postions for applying adhesive material to the surface of a pivot bore formed in each of the action parts; and (d) bushing assembly means disposed laterally of said guide means at a second one of said rest positions processwise subsequent to said dispenser means for inserting a tubular bushing in the pivot bore formed in each of the action parts, including means delivering a tubular bushing into coaxial alignment with the location of said pivot bore at said second rest position and a reciprocable piston coaxial with the pivot bore location for driving said bushing into said pivot bore.

10. The combination according to claim 9 wherein said delivering means comprises a first forming member for receiving and folding a portion of a strip of bushing material generally about the longitudinal axis thereof, a repositionable transfer member having a pocket alignable with the discharge end of said forming member for receiving a length of the folded bushing material, bushing material transport means arranged with said forming member and including a cylically operable element engageable with said bushing material for advancing the same from said forming member to said pocket, means coupled to said transfer member for repositioning the same whereby to move said pocket from alignment with said forming member to alignment with the pivot bore location, cutter means actuatable to sever the length of bushing material in said pocket from the remainder thereof whereby to permit repositioning of the transfer member, and a second forming member alignable with the position of said pocket adjacent said pivot bore location and operable into engagement with the length of bushing material in said pocket to work said material into tubular form for assembly in said pivot bore.

11. In apparatus to be used in making parts for a piano action, the combination comprising:
 (a) guide means for supporting a plurality of such parts in predetermined spatial orientation;
 (b) cylically operable means for progressively and incrementally transporting said parts through said guide means, the end of each increment of movement defining a rest position for the parts; and
 (c) bushing assembly means disposed laterally of said guide means at one of said rest positions for inserting a tubular bushing in the pivot bore formed in each of the action parts, including means delivering a tubular bushing into coaxial alignment with the location of said pivot bore at said one rest position and a reciprocable piston coaxial with the pivot bore location at said rest position for driving said bushing into said pivot bore, said delivering means comprising supply container means for holding a plurality of tubular bushings, a repositionable transfer member having a pocket alignable with the discharge end of said container means, means coupled to said transfer member for repositioning the same whereby to move said pocket from alignment with said container means to a position adjacent the pivot bore location, and receptacle means aligned between said reciprocable piston and the pivot bore location for receiving a bushing from said pocket preparatory to assembly thereof with an action part.

12. In apparatus to be used in making parts for a piano action, the combination comprising:
 (a) guide means for supporting a plurality of such parts in predetermined spatial orientation;
 (b) cyclically operable means for progressively and incrementally transporting said parts through said guide means, the end of each increment of movement defining a rest position for the parts;
 (c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body; and
 (d) bushing assembly means disposed laterally of said guide means at a second one of said rest positions processwise subequent to said dispenser means for inserting a tubular bushing in the pivot bore formed in each of the action parts, including means delivering a tubular bushing into coaxial alignment with the location of said pivot bore at said second rest position and a reciprocable piston coaxial with the pivot bore location for driving said bushing into said pivot bore.

13. In apparatus to be used in making parts for a piano action, the combination comprising:
 (a) guide means for supporting a plurality of such parts in predetermined spatial orientation;
 (b) cyclically operable means for progressively and incrementally transporting said parts through said guide means, the end of each increment of movement defining a rest position for the parts;
 (c) dispenser means disposed laterally of said guide means at a first one of said rest positions for applying adhesive material to the surface of a pivot bore formed in each of the action parts, including a dispenser body mounted for movement toward and away from said first rest position and an applicator piston slidably mounted in said dispenser body, said dispenser body having an exterior shoulder adapted to define an abutment for sealingly engaging a sidewall of a said part around the pivot bore therein upon movement of said dispenser body toward said first rest position; and
 (d) bushing assembly means disposed laterally of said guide means at a second one of said rest positions processwise subsequent to said dispenser means for inserting a tubular bushing in the pivot bore formed in each of the action parts, including means delivering a tubular bushing into coaxial alignment with the location of said pivot bore at said second rest position and a reciprocable piston coaxial with the pivot bore location for driving said bushing into said pivot bore, said delivering means comprising a first forming member for receiving and folding a portion of a strip of bushing material generally about the longitudinal axis thereof, a repositionable transfer member having a pocket alignable with the discharge end of said forming member for receiving a length of the folded bushing material, bushing material transport means arranged with said forming member and including a cyclically operable element engageable with said bushing material for advancing the same from said forming member to said pocket, means coupled to said transfer member for repositioning the same whereby to move said pocket from alignment with said forming member to alignment with the pivot bore location, cutter means actuatable to sever the length of bushing material in said pocket from the remainder thereof whereby to permit repositioning of the transfer member, and a second forming member alignable with the position of said pocket adjacent said pivot bore location and operable into engagement with the length of bushing material in said pocket to work said material into tubular form for assembly in said pivot bore.

14. In apparatus to be used in making parts for a piano action, the combination comprising:
 (a) guide means for supporting a plurality of such parts in predetermined spatial orientation;
 (b) cyclically operable means for progressively and incrementally transporting said parts through said guide means, the end of each increment of movement defining a rest position for the parts;
 (c) dispenser means disposed laterally of said guide means at a first one of said rest positions for applying adhesive material to the surface of a pivot bore formed in each of the action parts, including a dispenser body mounted adjacent said first rest position and an applicator piston slidably mounted in said dispenser body, said dispenser body having a cavity adapted to receive adhesive material and a guide bore for said piston open to said cavity and communicating exteriorly of said body; and
 (d) bushing assembly means disposed laterally of said guide means at a second one of said rest positions processwise subsequent to said dispenser means for inserting a tubular bushing in the pivot bore formed in each of the action parts, including means delivering a tubular bushing into coaxial alignment with the location of said pivot bore at said second rest position and a reciprocable piston coaxial with the pivot bore location for driving said bushing into said pivot bore, said delivering means comprising a first forming member for receiving and folding a portion of a strip of bushing material generally about the longitudinal axis thereof, a repositionable transfer member having a pocket alignable with the discharge end of said forming member for receiving a length of the folded bushing material, bushing material transport means arranged with said forming member and including a cyclically operable element engageable with said bushing material for advancing the same from said forming member to said pocket, means coupled to said transfer member for repositioning the same whereby to move said pocket from alignment with said forming member to alignment with the pivot bore location, cutter means actuatable to sever the length of bushing material in said pocket from the remainder thereof whereby to permit repositioning of the transfer member, and a second forming member alignable with the position of said pocket adjacent said pivot bore location and operable into engagement with the length of bushing material in said pocket to work said material into tubular form for assembly in said pivot bore.

15. In apparatus to be used in making parts for a piano action, the combination comprising:
(a) guide means for supporting a plurality of such parts in predetermined spatial orientation;
(b) cyclically operable means for progressively and incrementally transporting said parts through said guide means, the end of each increment of movement defining a rest position for the parts;
(c) dispenser means disposed laterally of said guide means at a first one of said rest positions for applying adhesive material to the surface of a pivot bore formed in each of the action parts;
(d) bushing assembly means disposed laterally of said guide means at a second one of said rest positions processwise subsequent to said dispenser means for inserting a tubular bushing in the pivot bore formed in each of the action parts; and
(e) a reciprocable tool disposed laterally of said guide means at a third one of said rest positions processwise subsequent to said second rest position for movement into and out of the central aperture in said tubular bushing whereby to size said aperture and shape the bushing material into substantially uniform contact with the adhesive coated surface of the surrounding pivot bore.

16. In apparatus to be used in making parts for a piano action, the combination comprising:
(a) guide means for supporting a plurality of such parts in predetermined spatial orientation;
(b) cyclically operable means for progressively and incrementally transporting said parts through said guide means, the end of each increment of movement defining a rest position for the parts;
(c) dispenser means disposed laterally of said guide means at a first one of said rest positions for applying adhesive material to the surface of a pivot bore formed in each of the action parts;
(d) bushing assembly means disposed laterally of said guide means at a second one of said rest positions processwise subsequent to said dispenser means for inserting a tubular bushing in the pivot bore formed in each of the action parts;
(e) parts holding means receiving the action parts from said cyclically operable means whereby to accommodate curing of said adhesive material; and
(f) parts finishing means receiving individual action parts from said holding means, including spaced cutter elements selectively operable into incising engagement with one of said parts on the opposite sides of a pivot bore thereof to trim the ends of the bushing inserted therein.

17. In apparatus to be used in making parts for a piano action, the combination comprising:
(a) guides means for supporting a plurality of such parts in predetermined spatial orientation, including floor members spaced apart to define a channel and side members rising from adjacent said floor members parallel to said channel;
(b) cyclically operable means for progressively and incrementally transporting said parts through said guide means, the end of each increment of movement defining a rest position for the parts, including a transfer bar operably disposed in said channel and having transfer dogs upstanding therefrom to engage said parts for transporting the same, said cyclically operable means further including cam drive means connected to said transfer bar and arranged to reciprocate said bar generally horizontally for transporting said parts and to reciprocate said bar generally vertically for the engagement and disengagement of said dogs with said parts;
(c) dispenser means disposed laterally of said guide means at a first one of said rest positions for applying adhesive material to the surface of a pivot bore formed in each of the action parts;
(d) bushing assembly means disposed laterally of said guide means at a second one of said rest positions processwise subsequent to said dispenser means for inserting a tubular bushing in the pivot bore formed in each of the action parts;
(e) parts holding means receiving the action parts from said cyclically operable means whereby to accommodate curing of said adhesive material; and
(f) parts finishing means receiving individual action parts from said holding means, including spaced cutter elements selectively operable into incising engagement with one of said parts on the opposite sides of a pivot bore thereof to trim the ends of the bushing inserted therein and simultaneously to trim at least one sidewall of the part.

18. In apparatus to be used in making parts for a piano action, the combination comprising:
(a) guide means for supporting a plurality of such parts in predetermined spatial orientation;
(b) cyclically operable means for progressively and incrementally transporting said parts through said guide means, the end of each increment of movement defining a rest position for the parts;
(c) dispenser means disposed laterally of said guide means at a first one of said rest positions for applying adhesive material to the surface of a pivot bore formed in each of the action parts;
(d) bushing assembly means disposed laterally of said guide means at a second one of said rest positions processwise subsequent to said dispenser means for inserting a tubular bushing in the pivot bore formed in each of the action parts;
(e) pin assembly means disposed laterally of said guide meas at a third one of said rest positions processwise subsequent to said second rest position for inserting a temporary pin in said tubular bushing;
(f) heating means disposed adjacent said guide means at a fourth one of said rest positions processwise subsequent to said third rest position, including a heated element selectively operable into thermal communication with a portion of a said temporary pin assembled to a said tubular bushing; and
(g) pin disassembly means disposed adjacent said guide means at a fifth one of said rest positions processwise subsequent to said fourth rest position for extracting said temporary pin from the bushing to which it has been assembled.

19. In apparatus to be used in making parts for a piano action, the combination comprising: a dispenser body and an applicator piston slidably mounted in said dispenser body for use in applying adhesive material to the surface of a pivot bore formed in a piano action part, said applicator piston having a radially enlarged, cylindrical head at its outer end and a recess inwardly from said head for carrying quantities of adhesive material to said pivot bore upon extension of said piston from said dispenser body and into said pivot bore, said head closely approximating the size and shape of said pivot bore whereby to wipe excess adhesive material from the surface of said pivot bore upon retraction therefrom.

20. In apparatus to be used in making parts for a piano action, the combination comprising: means delivering a tubular bushing into coaxial alignment with the pivot bore formed in an action part, including a first forming member for receiving and folding a portion of a strip of bushing material generally about the longitudinal axis thereof, a repositionable transfer member having a pocket alignable with the discharge end of said forming member for receiving an end portion of said strip of folded bushing material, bushing material transport means arranged with said forming member and including a cyclically operable element engageable with said strip of bushing material for advancing the same from said forming member to said pocket, means coupled to said transfer member for repositioning the same whereby to move said pocket from alignment with said forming member to alignment with the pivot bore, cutter means aligned closely parallel with said transfer member and actuatable to sever the length of bushing material in said pocket from the remainder of said strip whereby to permit repositioning of the transfer member, and a second forming member alignable with the position of said pocket adjacent said pivot bore and operable into engagement with the length of bushing material in said pocket to work said material into tubular form for assembly in said pivot bore; and a reciprocable piston coaxial with the pivot bore for driving said bushing into said pivot bore.

References Cited

UNITED STATES PATENTS

| | | | |
|---|---|---|---|
| 1,041,820 | 9/1912 | Larson et al. | 144—2 |
| 1,488,172 | 3/1924 | Semple | 144—2 |
| 2,927,493 | 3/1960 | Schwarzbaur | 84—251 |
| 2,948,180 | 8/1960 | Wood | 84—251 |
| 1,010,594 | 12/1911 | Cowles | 118—215 |
| 1,383,497 | 5/1921 | Sylvester | 144—2 |
| 2,324,455 | 7/1943 | Keim et al. | 118—408 |

DOUGLAS J. DRUMMOND, *Primary Examiner.*